United States Patent
Bessios et al.

(10) Patent No.: US 7,180,959 B2
(45) Date of Patent: *Feb. 20, 2007

(54) TECHNIQUE FOR UTILIZING SPARE BANDWIDTH RESULTING FROM THE USE OF A CODE IN A MULTI-LEVEL SIGNALING SYSTEM

(75) Inventors: Anthony Bessios, Fremont, CA (US); Jared Zerbe, Woodside, CA (US)

(73) Assignee: Rambus Inc., Los Altos, CA (US)

( * ) Notice: Subject to any disclaimer, the term of this patent is extended or adjusted under 35 U.S.C. 154(b) by 289 days.

This patent is subject to a terminal disclaimer.

(21) Appl. No.: 10/878,342

(22) Filed: Jun. 29, 2004

(65) Prior Publication Data

US 2004/0240580 A1 Dec. 2, 2004

Related U.S. Application Data

(63) Continuation-in-part of application No. 10/314,985, filed on Dec. 10, 2002.

(51) Int. Cl.
*H04L 25/34* (2006.01)
*H04L 25/49* (2006.01)

(52) U.S. Cl. .................................... 375/286

(58) Field of Classification Search ........ 375/286–294, 375/353
See application file for complete search history.

(56) References Cited

U.S. PATENT DOCUMENTS

| | | | |
|---|---|---|---|
| 3,733,550 A * | 5/1973 | Tazaki et al. ............... | 375/288 |
| 3,754,237 A | 8/1973 | de Laage de Meux | |
| 3,781,686 A * | 12/1973 | Ching ........................ | 375/245 |
| 3,940,694 A * | 2/1976 | Price et al. .................. | 708/277 |
| 3,988,676 A * | 10/1976 | Whang ....................... | 375/293 |
| 4,408,189 A | 10/1983 | Betts et al. | |
| 4,486,739 A | 12/1984 | Franaszek et al. | |
| 4,495,626 A | 1/1985 | Brunin et al. | |
| 4,524,462 A * | 6/1985 | Cottatelucci ................. | 398/79 |
| 4,665,517 A | 5/1987 | Widmer | |
| 4,667,337 A | 5/1987 | Fletcher | |
| 4,855,742 A | 8/1989 | Verboom | |
| 5,142,167 A | 8/1992 | Temple et al. | |
| 5,655,078 A | 8/1997 | Anderson et al. | |
| 5,903,231 A | 5/1999 | Emelko | |
| 5,999,571 A | 12/1999 | Shin et al. | |
| 6,005,895 A | 12/1999 | Perino et al. | |
| 6,018,304 A | 1/2000 | Bessios | |
| 6,031,472 A | 2/2000 | Johnson et al. | |
| 6,067,326 A | 5/2000 | Jonsson et al. | |
| 6,078,627 A | 6/2000 | Crayford | |
| 6,094,461 A | 7/2000 | Heron | |
| 6,147,544 A * | 11/2000 | Tanizaki et al. ............ | 327/403 |
| 6,226,330 B1 | 5/2001 | Mansur | |
| 6,324,602 B1 | 11/2001 | Chen et al. | |
| 6,538,584 B2 | 3/2003 | Borkar et al. | |
| 6,731,692 B1 | 5/2004 | Bhoja | |
| 2003/0108134 A1 | 6/2003 | Stonick et al. | |
| 2003/0152154 A1 | 8/2003 | Johnson | |

OTHER PUBLICATIONS

Mrcea R. Stan et al., "Coding a terminated bus for low power," Great Lakes Sympon VLSI., Mar. 1995, pp. 70-73.

(Continued)

*Primary Examiner*—Don N. Vo
(74) *Attorney, Agent, or Firm*—Hunton & Williams LLP

(57) ABSTRACT

A technique for utilizing spare bandwidth resulting from the use of a code in a multi-level signaling system is disclosed. In one particular exemplary embodiment, the technique may be realized as a method for utilizing spare bandwidth resulting from the use of a code in a multi-level signaling system, wherein the code has a characteristic wherein a signal transition is periodically unused. Such a method may comprise modifying the code such that the periodically unused signal transition is used to represent additional information.

61 Claims, 13 Drawing Sheets

OTHER PUBLICATIONS

Mrcea R. Stan, "Bus-Invert coding for low power I/O," IEEE Transactions On Very Large Scale Integration (VLSI) System, vol. XX, No. Y, 1999, pp. 100-108.

Kazuyuki Nakamura et al., A 500-MHz 4-Mb CMOS pipeline-burst cache SRAM with point-to-point noise reduction coding I/O.

David D. Falconer et al., "Bounds on error-pattern probabilites for digital communications systems," IEEE Transactions Communications, vol. COM-20, No. 2, Apr. 1972, pp. 132-139.

Ramin Farjad-Rad et al., "A 0.3-µm CMOS 8-GB/s 4-PAM serial link transceiver," IEEE Journal of Solid-State Circuits, vol. 35, No. 5, May 2000.

A. X. Widmer et al., "A dc-balanced, partitioned-block, 8B/10B transmission code," pp. 440-451.

International Search Report dated Oct. 8, 2004 for International Application No. PCT/US03/38889.

* cited by examiner

CASE I

Mappings of replaceable onto unused transitions:

|     | $S_5^{(k)}$ | $S_1^{(k+1)}$ | $C_9^{(k)}$ | $C_{10}^{(k)}$ | $C_1^{(k+1)}$ | $C_2^{(k+1)}$ |     | $S_5^{(k)}$ | $S_1^{(k+1)}$ | $C_9^{(k)}$ | $C_{10}^{(k)}$ | $C_1^{(k+1)}$ | $C_2^{(k+1)}$ |
|-----|-------------|---------------|-------------|----------------|---------------|---------------|-----|-------------|---------------|-------------|----------------|---------------|---------------|
| rt1 | 3           | 1             | 0           | 0              | 0             | 1             | ut1 | 3           | 3             | 0           | 0              | 0             | 0             |
| rt2 | 1           | 1             | 0           | 1              | 0             | 1             | ut2 | 1           | 3             | 0           | 1              | 0             | 0             |
|     | $S_1^{(k+1)}$ | $S_2^{(k+1)}$ | $C_1^{(k+1)}$ | $C_2^{(k+1)}$ | $C_3^{(k+1)}$ | $C_4^{(k+1)}$ |     | $S_1^{(k+1)}$ | $S_2^{(k+1)}$ | $C_1^{(k+1)}$ | $C_2^{(k+1)}$ | $C_3^{(k+1)}$ | $C_4^{(k+1)}$ |
| rt5 | 1           | 1             | 0           | 1              | 0             | 1             | ut5 | 3           | 1             | 0           | 0              | 0             | 1             |
| rt6 | 1           | 3             | 0           | 1              | 0             | 0             | ut6 | 3           | 3             | 0           | 0              | 0             | 0             |

Non-replaceable transitions:

|      | $S_5^{(k)}$ | $S_1^{(k+1)}$ | $C_9^{(k)}$ | $C_{10}^{(k)}$ | $C_1^{(k+1)}$ | $C_2^{(k+1)}$ |
|------|-------------|---------------|-------------|----------------|---------------|---------------|
| nrt3 | -1          | 1             | 1           | 1              | 0             | 1             |

|      | $S_1^{(k+1)}$ | $S_2^{(k+1)}$ | $C_1^{(k+1)}$ | $C_2^{(k+1)}$ | $C_3^{(k+1)}$ | $C_4^{(k+1)}$ |
|------|---------------|---------------|---------------|---------------|---------------|---------------|
| nrt4 | 1             | -1            | 0             | 1             | 1             | 1             |

Restricted transitions:

|      | $S_5^{(k)}$ | $S_1^{(k+1)}$ | $C_9^{(k)}$ | $C_{10}^{(k)}$ | $C_1^{(k+1)}$ | $C_2^{(k+1)}$ |
|------|-------------|---------------|-------------|----------------|---------------|---------------|
| rut3 | -1          | 3             | 1           | 1              | 0             | 0             |

|      | $S_1^{(k+1)}$ | $S_2^{(k+1)}$ | $C_1^{(k+1)}$ | $C_2^{(k+1)}$ | $C_3^{(k+1)}$ | $C_4^{(k+1)}$ |
|------|---------------|---------------|---------------|---------------|---------------|---------------|
| rut4 | 3             | -1            | 0             | 0             | 1             | 1             |

Figure 4

CASE II

Mappings of replaceable onto unused transitions:

|  | $S_5^{(k)}$ | $S_1^{(k+1)}$ | $C_9^{(k)}$ | $C_{10}^{(k)}$ | $C_1^{(k+1)}$ | $C_2^{(k+1)}$ |  | $S_5^{(k)}$ | $S_1^{(k+1)}$ | $C_9^{(k)}$ | $C_{10}^{(k)}$ | $C_1^{(k+1)}$ | $C_2^{(k+1)}$ |
|---|---|---|---|---|---|---|---|---|---|---|---|---|---|
| rt8 | -1 | -1 | 1 | 1 | 1 | 1 | ut8 | -1 | -3 | 1 | 1 | 1 | 0 |
| rt9 | -3 | -1 | 1 | 0 | 1 | 1 | ut9 | -3 | -3 | 1 | 0 | 1 | 0 |
|  | $S_1^{(k+1)}$ | $S_2^{(k+1)}$ | $C_1^{(k+1)}$ | $C_2^{(k+1)}$ | $C_3^{(k+1)}$ | $C_4^{(k+1)}$ |  | $S_1^{(k+1)}$ | $S_2^{(k+1)}$ | $C_1^{(k+1)}$ | $C_2^{(k+1)}$ | $C_3^{(k+1)}$ | $C_4^{(k+1)}$ |
| rt10 | -1 | -1 | 1 | 1 | 1 | 0 | ut10 | -3 | -3 | 1 | 0 | 1 | 0 |
| rt11 | -3 | -1 | 1 | 1 | 1 | 1 | ut11 | -3 | -1 | 1 | 0 | 1 | 1 |

Non-replaceable transitions:

|  | $S_5^{(k)}$ | $S_1^{(k+1)}$ | $C_9^{(k)}$ | $C_{10}^{(k)}$ | $C_1^{(k+1)}$ | $C_2^{(k+1)}$ |
|---|---|---|---|---|---|---|
| nrt7 | 1 | -1 | 0 | 1 | 1 | 1 |
|  | $S_1^{(k+1)}$ | $S_2^{(k+1)}$ | $C_1^{(k+1)}$ | $C_2^{(k+1)}$ | $C_3^{(k+1)}$ | $C_4^{(k+1)}$ |
| nrt12 | -1 | 1 | 1 | 1 | 0 | 1 |

Restricted transitions:

|  | $S_5^{(k)}$ | $S_1^{(k+1)}$ | $C_9^{(k)}$ | $C_{10}^{(k)}$ | $C_1^{(k+1)}$ | $C_2^{(k+1)}$ |
|---|---|---|---|---|---|---|
| rut7 | 1 | -3 | 0 | 1 | 1 | 0 |
|  | $S_1^{(k+1)}$ | $S_2^{(k+1)}$ | $C_1^{(k+1)}$ | $C_2^{(k+1)}$ | $C_3^{(k+1)}$ | $C_4^{(k+1)}$ |
| rut12 | -3 | 1 | 1 | 0 | 0 | 1 |

Figure 5

CASE III

Mappings of replaceable onto unused transitions:

|  | $S_5^{(k)}$ | $S_1^{(k+1)}$ | $C_9^{(k)}$ | $C_{10}^{(k)}$ | $C_1^{(k+1)}$ | $C_2^{(k+1)}$ |  | $S_5^{(k)}$ | $S_1^{(k+1)}$ | $C_9^{(k)}$ | $C_{10}^{(k)}$ | $C_1^{(k+1)}$ | $C_2^{(k+1)}$ |
|---|---|---|---|---|---|---|---|---|---|---|---|---|---|
| rt13 | 3 | -1 | 0 | 0 | 1 | 1 | ut13 | 3 | 3 | 0 | 0 | 0 | 0 |
| rt14 | 1 | -1 | 0 | 1 | 1 | 1 | ut14 | 1 | 3 | 0 | 1 | 0 | 0 |
|  | $S_1^{(k+1)}$ | $S_2^{(k+1)}$ | $C_1^{(k+1)}$ | $C_2^{(k+1)}$ | $C_3^{(k+1)}$ | $C_4^{(k+1)}$ |  | $S_1^{(k+1)}$ | $S_2^{(k+1)}$ | $C_1^{(k+1)}$ | $C_2^{(k+1)}$ | $C_3^{(k+1)}$ | $C_4^{(k+1)}$ |
| rt17 | -1 | 1 | 1 | 1 | 0 | 1 | ut17 | 3 | 1 | 0 | 0 | 0 | 1 |
| rt18 | -1 | 3 | 1 | 1 | 0 | 0 | ut18 | 3 | 3 | 0 | 0 | 0 | 0 |

Non-replaceable transitions:

|  | $S_5^{(k)}$ | $S_1^{(k+1)}$ | $C_9^{(k)}$ | $C_{10}^{(k)}$ | $C_1^{(k+1)}$ | $C_2^{(k+1)}$ |
|---|---|---|---|---|---|---|
| nrt15 | -1 | -1 | 1 | 1 | 1 | 1 |
|  | $S_1^{(k+1)}$ | $S_2^{(k+1)}$ | $C_1^{(k+1)}$ | $C_2^{(k+1)}$ | $C_3^{(k+1)}$ | $C_4^{(k+1)}$ |
| nrt16 | -1 | -1 | 1 | 1 | 1 | 1 |

Restricted transitions:

|  | $S_5^{(k)}$ | $S_1^{(k+1)}$ | $C_9^{(k)}$ | $C_{10}^{(k)}$ | $C_1^{(k+1)}$ | $C_2^{(k+1)}$ |
|---|---|---|---|---|---|---|
| rut15 | -1 | 3 | 1 | 1 | 0 | 0 |
|  | $S_1^{(k+1)}$ | $S_2^{(k+1)}$ | $C_1^{(k+1)}$ | $C_2^{(k+1)}$ | $C_3^{(k+1)}$ | $C_4^{(k+1)}$ |
| rut16 | 3 | -1 | 0 | 0 | 1 | 1 |

Figure 6

CASE IV

Mappings of replaceable onto unused transitions:

|  | $S_5^{(k)}$ | $S_1^{(k+1)}$ | $C_9^{(k)}$ | $C_{10}^{(k)}$ | $C_1^{(k+1)}$ | $C_2^{(k+1)}$ |  | $S_5^{(k)}$ | $S_1^{(k+1)}$ | $C_9^{(k)}$ | $C_{10}^{(k)}$ | $C_1^{(k+1)}$ | $C_2^{(k+1)}$ |
|---|---|---|---|---|---|---|---|---|---|---|---|---|---|
| rt20 | -1 | 1 | 1 | 1 | 0 | 1 | ut20 | -1 | -3 | 1 | 1 | 1 | 0 |
| rt21 | -3 | 1 | 1 | 0 | 0 | 1 | ut21 | -3 | -3 | 1 | 0 | 1 | 0 |

|  | $S_1^{(k+1)}$ | $S_2^{(k+1)}$ | $C_1^{(k+1)}$ | $C_2^{(k+1)}$ | $C_3^{(k+1)}$ | $C_4^{(k+1)}$ |  | $S_1^{(k+1)}$ | $S_2^{(k+1)}$ | $C_1^{(k+1)}$ | $C_2^{(k+1)}$ | $C_3^{(k+1)}$ | $C_4^{(k+1)}$ |
|---|---|---|---|---|---|---|---|---|---|---|---|---|---|
| rt22 | 1 | -3 | 0 | 1 | 1 | 0 | ut22 | -3 | -3 | 1 | 0 | 1 | 0 |
| rt23 | 1 | -1 | 0 | 1 | 1 | 1 | ut23 | -3 | -1 | 1 | 0 | 1 | 1 |

Non-replaceable transitions:

|  | $S_5^{(k)}$ | $S_1^{(k+1)}$ | $C_9^{(k)}$ | $C_{10}^{(k)}$ | $C_1^{(k+1)}$ | $C_2^{(k+1)}$ |
|---|---|---|---|---|---|---|
| nrt19 | 1 | 1 | 0 | 1 | 0 | 1 |

|  | $S_1^{(k+1)}$ | $S_2^{(k+1)}$ | $C_1^{(k+1)}$ | $C_2^{(k+1)}$ | $C_3^{(k+1)}$ | $C_4^{(k+1)}$ |
|---|---|---|---|---|---|---|
| nrt24 | 1 | 1 | 0 | 1 | 0 | 1 |

Restricted transitions:

|  | $S_5^{(k)}$ | $S_1^{(k+1)}$ | $C_9^{(k)}$ | $C_{10}^{(k)}$ | $C_1^{(k+1)}$ | $C_2^{(k+1)}$ |
|---|---|---|---|---|---|---|
| rut19 | 1 | -3 | 0 | 1 | 1 | 0 |

|  | $S_1^{(k+1)}$ | $S_2^{(k+1)}$ | $C_1^{(k+1)}$ | $C_2^{(k+1)}$ | $C_3^{(k+1)}$ | $C_4^{(k+1)}$ |
|---|---|---|---|---|---|---|
| rut24 | -3 | 1 | 1 | 0 | 0 | 1 |

Figure 7

TECHNIQUE FOR UTILIZING SPARE BANDWIDTH RESULTING FROM THE USE OF A CODE IN A MULTI-LEVEL SIGNALING SYSTEM

CROSS-REFERENCE TO RELATED APPLICATIONS

This patent application is a continuation-in-part application of U.S. patent application Ser. No. 10/314,985, filed Dec. 10, 2002, which is hereby incorporated by reference herein in its entirety.

FIELD OF THE DISCLOSURE

The present disclosure relates generally to multi-level signaling and, more particularly, to a technique for utilizing spare bandwidth resulting from the use of a code in a multi-level signaling system.

BACKGROUND OF THE DISCLOSURE

High-speed serial link channels delivering an effective data rate above 5 Gb/s in a backplane environment are subject to significant signal distortion due to inter-symbol interference (ISI). Transmitters and receivers need to compensate for most of the signal distortion using very low complexity schemes in order to obtain a target bit error rate (BER) of less than or equal to $10^{-17}$ at Gb/s rates and under severe power and complexity restrictions. This constrained space presents significant challenges to well-known signal processing and coding techniques, and sub-optimal but efficient alternatives are sometimes needed to fulfill the task.

Attenuation caused by conductor and dielectric losses causes dispersion ISI. Another important ISI component is reflections, which are essentially multipath components of a signal and originate from impedance discontinuities such as those caused by connectors of line cards at both transmit and receive ends. In addition to ISI distortion, cross-talk effects from far and near end adjacent channels is becoming increasingly significant.

To counteract channel attenuation at high bit rates, conventional 2-level pulse amplitude modulation (2-PAM) signaling may be replaced by other multi-level signaling schemes that utilize more than two signal levels. That is, in a 2-PAM signaling system, each conductor in the system may carry signals at one of two signal levels (i.e., at either a logic zero level or a logic one level). Thus, in a 2-PAM signaling system, each conductor in the system can only transmit one bit of data per bit time. However, in a 4-level pulse amplitude modulation (4-PAM) signaling system, for example, each conductor in the system may carry signals at four different signal levels (i.e., four different symbols). Thus, in a 4-PAM signaling system, each conductor in the system can transmit two bits of data simultaneously at one half the symbol rate for an equivalent bandwidth.

While advantageous in channels with dominant attenuation, signaling systems that utilize more than two signal levels may be more sensitive to reflections and cross-talk than 2-PAM signaling systems due to the reduction in signal margin as a result of carrying more information per symbol. Thus, in cases where high loss and reflections are combined, the advantages of signaling systems that utilize more than two signal levels over 2-PAM signaling systems may be lost.

In order to preserve the advantages of signaling systems that utilize more than two signal levels over 2-PAM signaling, it is desirable to eliminate full-swing transitions (FST) between sequential symbols, as illustrated in the above-referenced U.S. patent application Ser. No. 10/314,985. This enhances system performance in terms of: 1.) voltage margins (Vm) by reducing peak distortion (PD) via the elimination of one or more worst case sequences; and 2.) timing margins (Tm), especially at outer eyes where FST close eyes the most.

It is also desirable to secure a minimum density of desirable signal transitions useful for clock recovery, as also illustrated in the above-referenced U.S. patent application Ser. No. 10/314,985. These clock data recovery (CDR) transitions prevent continuous phase drifting from an optimum sampling point at the center of an eye in plesiochronous systems with frequency offsets between received data and a local receive clock.

As described in the above-referenced U.S. patent application Ser. No. 10/314,985, transition-limiting codes may be utilized in multi-PAM signaling systems to realize the above-mentioned desirable qualities. As also described in the above-referenced U.S. patent application Ser. No. 10/314,985, a unique property exists in certain transition-limiting codes, whereby certain outer multi-PAM signal levels, and their associated signal transitions, are periodically unused. As further described in the above-referenced U.S. patent application Ser. No. 10/314,985, these periodically unused outer multi-PAM signal levels, and their associated signal transitions, may be used in framing codewords (i.e., identifying the boundary of a codeword). However, the use of these periodically unused outer multi-PAM signal levels, and their associated signal transitions, is not limited in this regard. That is, since these periodically unused outer multi-PAM signal levels, and their associated signal transitions, essentially constitute spare bandwidth, it may be desirable to use these periodically unused outer multi-PAM signal levels, and their associated signal transitions, for other beneficial purposes.

In view of the foregoing, it would be desirable to provide a technique for utilizing spare bandwidth resulting from the use of a code in a multi-level signaling system in an efficient and cost effective manner.

SUMMARY OF THE DISCLOSURE

A technique for utilizing spare bandwidth resulting from the use of a code in a multi-level signaling system is disclosed. In one particular exemplary embodiment, the technique may be realized as a method for utilizing spare bandwidth resulting from the use of a code in a multi-level signaling system, wherein the code has a characteristic wherein a signal transition is periodically unused. Such a method may comprise modifying the code such that the periodically unused signal transition is used to represent additional information.

In accordance with other aspects of this particular exemplary embodiment, the code may beneficially be formed by encoding digital values represented by sets of N bits to provide corresponding sets of P symbols. Also, each set of P symbols may beneficially be formed with Q bits, wherein Q is greater than N. For example, N may equal 8 and Q may equal 10, and each symbol may represent two bits.

In accordance with further aspects of this particular exemplary embodiment, modifying the code may beneficially comprise changing the logic state of at least one codeword bit in the code.

In accordance with additional aspects of this particular exemplary embodiment, the additional information may beneficially comprise control information, data information, error information, framing information, and/or synchronization information.

In accordance with still other aspects of this particular exemplary embodiment, the method may further beneficially comprise transmitting the modified code. If such is the case, the modified code may beneficially be transmitted at four signal levels on a single transmission medium such as, for example, a single electrical conductor, a differential pair of electrical conductors, or an optical fiber. Also, the method may then further beneficially comprise receiving the transmitted modified code, and detecting the additional information in the received modified code. The method may then still further beneficially comprise removing the additional information from the received modified code so as to return the modified code to an original unmodified state. The method may then even still further beneficially comprise decoding the original code after the additional information is removed.

In accordance with still further aspects of this particular exemplary embodiment, the code may beneficially have a further characteristic wherein a plurality of signal transitions may be periodically unused, and wherein one or more of the plurality of periodically unused signal transitions may be restricted from being used to represent additional information at least at certain times. If such is the case, and if the modified code is transmitted, the method may further beneficially comprise receiving the transmitted modified code, and detecting the use of a signal transition that has been restricted. Also, if such is the case, the method may further beneficially comprise generating an error signal based at least in part upon the detected restricted signal transition use.

In accordance with still additional aspects of this particular exemplary embodiment, the code may beneficially be a transition-limiting code. For example, the transition-limiting code may beneficially operate to eliminate full-swing transitions between at least two symbols of a codeword. Alternatively, the transition-limiting code may beneficially operate to reduce full-swing transitions between at least two symbols of a codeword.

In another particular exemplary embodiment, the technique may be realized as at least one signal embodied in at least one carrier wave for transmitting a computer program of instructions configured to be readable by at least one processor for instructing the at least one processor to execute a computer process for performing the above-described method.

In still another particular exemplary embodiment, the technique may be realized as at least one processor readable carrier for storing a computer program of instructions configured to be readable by at least one processor for instructing the at least one processor to execute a computer process for performing the above-described method.

In still another particular exemplary embodiment, the technique may be realized as an apparatus for utilizing spare bandwidth resulting from the use of a code in a multi-level signaling system, wherein the code has a characteristic wherein a signal transition is periodically unused. Such an apparatus may comprise a modifier for modifying the code such that the periodically unused signal transition is used to represent additional information.

In accordance with other aspects of this particular exemplary embodiment, the apparatus may further beneficially comprise a transmitter for transmitting the modified code, a receiver for receiving the transmitted modified code, a detector for detecting the additional information in the received modified code, and/or a decoder for decoding the original code after the additional information is removed.

In accordance with further aspects of this particular exemplary embodiment, the code may beneficially have a further characteristic wherein a plurality of signal transitions may be periodically unused, and wherein one or more of the plurality of periodically unused signal transitions may be restricted from being used to represent additional information at least at certain times. If such is the case, and if the modified code is transmitted, the apparatus may further beneficially comprise a receiver for receiving the transmitted modified code, and a detector for detecting the use of a signal transition that has been restricted. Also, if such is the case, the detector may beneficially generate an error signal based at least in part upon the detected restricted signal transition use.

In accordance with additional aspects of this particular exemplary embodiment, the apparatus may beneficially comprise additional features similar to those recited above with respect to the above-described method.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure could be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

FIG. 4 shows three tables including a mapping table (top) containing symbol domain and codeword bit domain transition mappings that may be used when spare bandwidth associated with periodically unused signal transitions may be used for other beneficial purposes in the Case I scenario described in FIG. 2 in accordance with an embodiment of the present disclosure.

FIG. 5 shows three tables including a mapping table (top) containing symbol domain and codeword bit domain transition mappings that may be used when spare bandwidth associated with periodically unused signal transitions may be used for other beneficial purposes in the Case II scenario described in FIG. 2 in accordance with an embodiment of the present disclosure.

FIG. 6 shows three tables including a mapping table containing symbol domain and codeword bit domain transition mappings that may be used when spare bandwidth associated with periodically unused signal transitions may be used for other beneficial purposes in the Case III scenario described in FIG. 2 in accordance with an embodiment of the present disclosure.

FIG. 7 shows three tables including a mapping table containing symbol domain and codeword bit domain transition mappings that may be used when spare bandwidth associated with periodically unused signal transitions may be used for other beneficial purposes in the Case IV scenario described in FIG. 2 in accordance with and embodiment of the present disclosure.

DETAILED DESCRIPTION OF EXEMPLARY EMBODIMENT(S)

Figure 1:
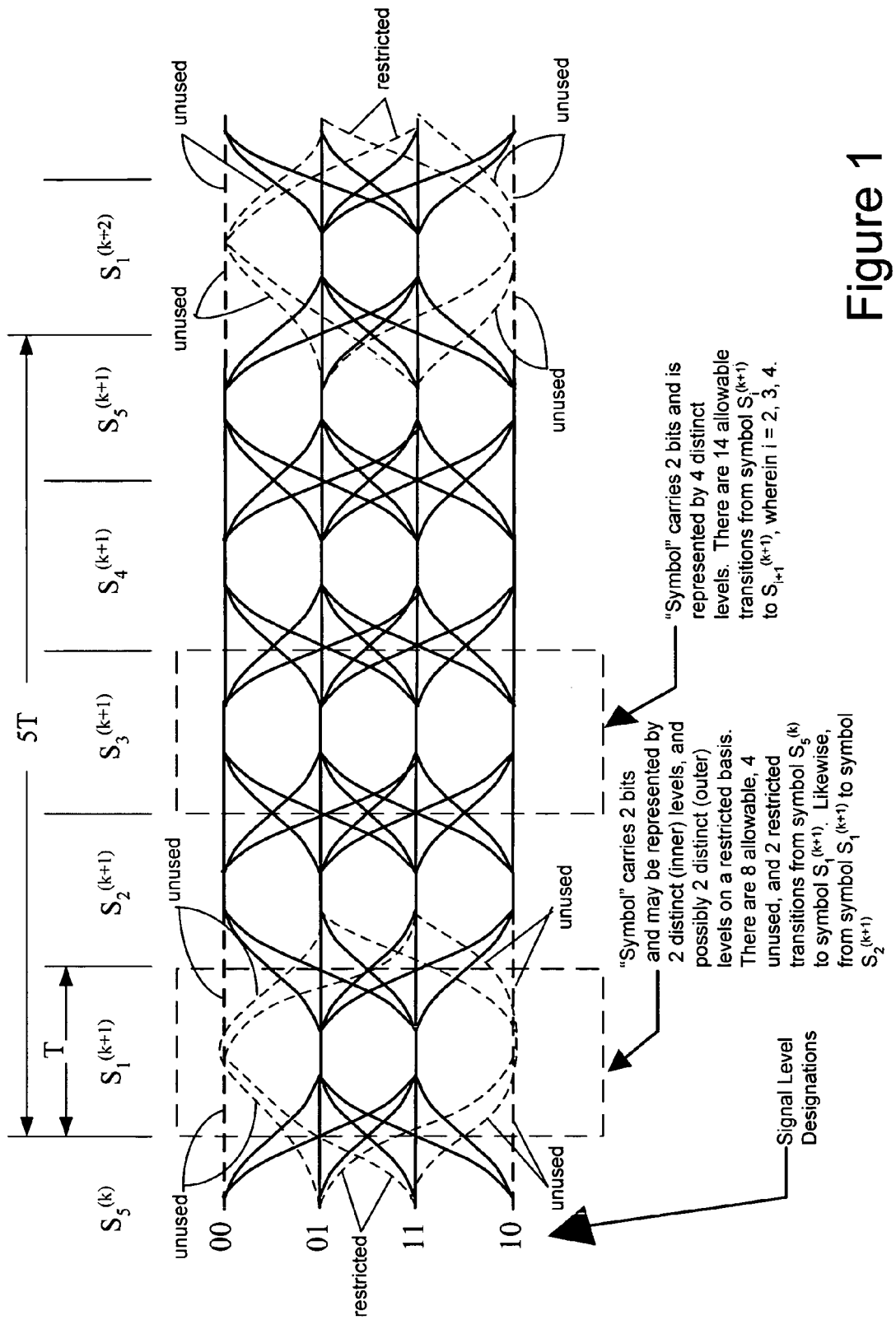
FIG. 1 shows a signal transition diagram for a 4-PAM signaling system utilizing a 4S5S transition-limiting code.

Referring to FIG. 1, there is shown a signal transition diagram for a 4-PAM signaling system utilizing a 4S5S transition-limiting code as described in the above-referenced U.S. patent application Ser. No. 10/314,985. As shown in FIG. 1, the 4S5S transition-limiting code has a unique property wherein certain signal transitions are periodically unused. That is, as shown in FIG. 1, the 4S5S transition-limiting code provides for 14 allowable signal transitions from symbol $s_i^{(k+1)}$ to symbol $s_{i+1}^{(k+1)}$, wherein i=2, 3, 4. However, as shown in FIG. 1, the 4S5S transition-limiting code only provides for 8 allowable signal transitions from symbol $s_5^{(k)}$ to symbol $s_1^{(k+1)}$ and 8 allowable signal transitions from symbol $s_1^{(k+1)}$ to symbol $s_2^{(k+1)}$. Of the remaining 6 possible signal transitions from symbol $s_5^{(k)}$ to symbol $s_1^{(k+1)}$ and the remaining 6 possible signal transitions from symbol $s_1^{(k+1)}$ to symbol $s_2^{(k+1)}$, there are 4 unused signal transitions from symbol $s_5^{(k)}$ to symbol $s_1^{(k+1)}$ and 4 unused signal transitions from symbol $s_1^{(k+1)}$ to symbol $s_2^{(k+1)}$, as well as 2 restricted signal transitions from symbol $s_5^{(k)}$ to symbol $s_1^{(k+1)}$ and 2 restricted signal transitions from symbol $s_1^{(k+1)}$ to symbol $s_2^{(k+1)}$. Assuming T is a symbol period, these unused signal transitions and restricted signal transitions periodically occur every 5T.

As described in the above-referenced U.S. patent application Ser. No. 10/314,985, periodically unused outer 4-PAM signal levels may be used to represent any number of types of additional information, such as, for example, control information, data information, error information, a DC voltage balancing property to the code being utilized in the system, equalization information (e.g., information used to adjust transmitter equalizer coefficients in the system), framing information (e.g., identifying the boundary of a codeword), synchronization information, etc. Likewise, the use of periodically unused signal transitions and periodically restricted signal transitions may be used for similar beneficial purposes. That is, since these periodically unused signal transitions and periodically restricted signal transitions essentially constitute spare bandwidth, these periodically unused signal transitions and periodically restricted signal transitions may be used for other beneficial purposes in accordance with the present disclosure.

Figure 2:
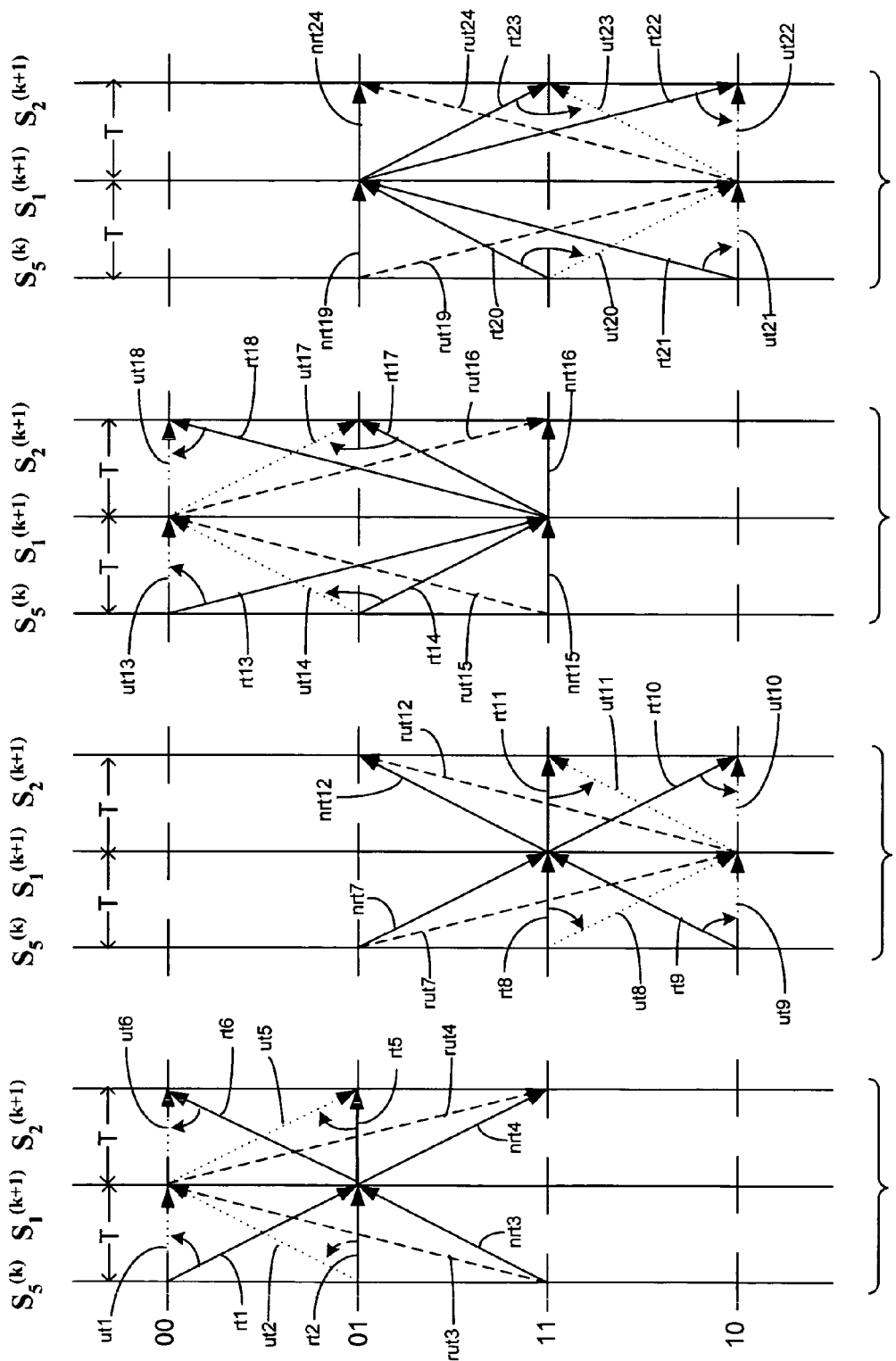
FIG. 2 shows a plurality of state transition diagrams for a 4-PAM signaling system utilizing a 4S5S transition-limiting code.

Referring to FIG. 2, there is shown a plurality of state transition diagrams for a 4-PAM signaling system utilizing a 4S5S transition-limiting code as described in the above-referenced U.S. patent application Ser. No. 10/314,985. In the 4S5S transition-limiting code described in the above-referenced U.S. patent application Ser. No. 10/314,985, outer 4-PAM signal levels, and their associated signal transitions, are periodically unused. One reason for periodically not using the outer 4-PAM signal levels, and their associated signal transitions, is to eliminate full-swing transitions between sequential blocks of symbols (e.g., between every 5 consecutive symbols). Eliminating full-swing transitions can reduce signal distortions, such as inter-symbol interference (ISI), which can affect the speed and/or the error rate at which data can be transmitted.

The plurality of state transition diagrams shown in FIG. 2 illustrate four separate cases (i.e., Cases I, II, III, and IV) when the above-described periodically unused and restricted signal transitions may or may not be used for other beneficial purposes in accordance with the present disclosure. In each case, a symbol may be represented by $s_j^{(k)}$, wherein j represents the symbol number within a codeword, and k represents the codeword number. In the embodiment described with respect to FIG. 2, the periodically unused and restricted signal transitions occur when transitioning from symbol $s_5^{(k)}$ to symbol $s_1^{(k+1)}$ and from symbol $s_1^{(k+1)}$ to symbol $s_2^{(k+1)}$. For example, in Case I, when the signal level of the fifth symbol in a first codeword (i.e., $s_5^{(k)}$, wherein k=1, 2, 3, . . . ) is 00 or 01 and the signal level of the second symbol in a second codeword (i.e., $s_2^{(k+1)}$, wherein k=1, 2, 3, . . . ) is 00 or 01, then the unused signal transitions associated with arriving at (i.e., ut1, ut2) and leaving (i.e., ut5, ut6) the uppermost signal level (i.e., 00) of the first symbol in the second codeword (i.e., $s_1^{(k+1)}$, wherein k=1, 2, 3, . . . ) may be used for other beneficial purposes in accordance with the present disclosure. In other words, a first replaceable signal transition (i.e., rt1) from symbol $s_5^{(k)}$ to symbol $s_1^{(k+1)}$ may be changed to a first unused signal transition (i.e., ut1) from symbol $s_5^{(k)}$ to symbol $s_1^{(k+1)}$, or a second replaceable signal transition (i.e., rt2) from symbol $s_5^{(k)}$ to symbol $s_1^{(k+1)}$ may be changed to a second unused signal transition (i.e., ut2) from symbol $s_5^{(k)}$ to symbol $s_1^{(k+1)}$, while a sixth replaceable signal transition (i.e., rt6) from symbol $s_1^{(k+1)}$ to symbol $s_2^{(k+1)}$ may be changed to a sixth unused signal transition (i.e., ut6) from symbol $s_1^{(k+1)}$ to symbol $s_2^{(k+1)}$, or a fifth replaceable signal transition (i.e., rt5) from symbol $s_1^{(k+1)}$ to symbol $s_2^{(k+1)}$ may be changed to a fifth unused signal transition (i.e., ut5) from symbol $s_1^{(k+1)}$ to symbol $s_2^{(k+1)}$, thereby allowing these previously unused signal transitions to be used for other beneficial purposes in accordance with the present disclosure. This is because such use would not form any of the restricted signal transitions (i.e., rut3, rut4), nor would it violate the transition-limiting properties (e.g., elimination of full-swing transitions) of the transition-limiting code. For example, if $s_5^{(k)}$ is 00 and $s_2^{(k+1)}$ is 00, then $s_1^{(k+1)}$ may be 00 because neither the transition from $s_5^{(k)}$ to $s_1^{(k+1)}$ (i.e., ut1 from 00 to 00) nor the transition from $s_1^{(k+1)}$ to $s_2^{(k+1)}$ (i.e., ut6 from 00 to 00) is a full-swing transition when using the Gray code assignment shown in FIG. 2.

Analogously, for example, in Case II, when the signal level of the fifth symbol in the first codeword (i.e., $s_5^{(k)}$, wherein k=1, 2, 3, . . . ) is 11 or 10 and the signal level of the second symbol in the second codeword (i.e., $s_2^{(k+1)}$, wherein k=1, 2, 3, . . . ) is 11 or 10, then the unused signal transitions associated with arriving at (i.e., ut8, ut9) and leaving (i.e., ut10, ut11) the lowermost signal level (i.e., 10) of the first symbol in the second codeword (i.e., $s_1^{(k+1)}$, wherein k=1, 2, 3, . . . ) may be used for other beneficial purposes in accordance with the present disclosure. In other words, an eighth replaceable signal transition (i.e., rt8) from symbol $s_5^{(k)}$ to symbol $s_1^{(k+1)}$ may be changed to an eighth unused signal transition (i.e., ut8) from symbol $s_5^{(k)}$ to symbol $s_1^{(k+1)}$, or a ninth replaceable signal transition (i.e., rt9) from symbol $s_5^{(k)}$ to symbol $s_1^{(k+1)}$ may be changed to an ninth unused signal transition (i.e., ut9) from symbol $s_5^{(k)}$ to symbol $s_1^{(k+1)}$, while a tenth replaceable signal transition (i.e., rt10) from symbol $s_1^{(k+1)}$ to symbol $s_2^{(k+1)}$ may be changed to a tenth unused signal transition (i.e., ut10) from symbol $s_1^{(k+1)}$ to symbol $s_2^{(k+1)}$, or an eleventh replaceable signal transition (i.e., rt11) from symbol $s_1^{(k+1)}$ to symbol $s_2^{(k+1)}$ may be changed to an eleventh unused signal transition (i.e., ut11) from symbol $s_1^{(k+1)}$ to symbol $s_2^{(k+1)}$, thereby allowing these previously unused signal transitions to be used for other beneficial purposes in accordance with the present disclosure. This is because such use would not form any of the restricted signal transitions (rut7, rut12), nor would it violate the transition-limiting properties of the transition-limiting code. For example, if $s_5^{(k)}$ is 11 and $s_2^{(k+1)}$ is 11, then $s_1^{(k+1)}$ may be 10 because neither the transition from $s_5^{(k)}$ to $s_1^{(k+1)}$ (i.e., ut8 from 11 to 10) nor the transition from $s_1^{(k+1)}$ to $s_2^{(k+1)}$ (i.e., ut11 from 10 to 11) is a full-swing transition when using the Gray code assignment shown in FIG. 2.

Analogously, for example, in Case III, when the signal level of the fifth symbol in a first codeword (i.e., $s_5^{(k)}$, wherein k=1, 2, 3, . . . . ) is 00 or 01 and the signal level of the second symbol in a second codeword (i.e., $s_2^{(k+1)}$, wherein k=1, 2, 3, . . . ) is 00 or 01, then the unused signal transitions associated with arriving at (i.e., ut13, ut14) and leaving (i.e., ut17, ut18) the uppermost signal level (i.e., 00) of the first symbol in the second codeword (i.e., $s_1^{(k+1)}$, wherein k=1, 2, 3, . . . ) may be used for other beneficial purposes in accordance with the present disclosure. In other words, a thirteenth replaceable signal transition (i.e., rt13) from symbol $s_5^{(k)}$ to symbol $s_1^{(k+1)}$ may be changed to a thirteenth unused signal transition (i.e., ut13) from symbol $s_5^{(k)}$ to symbol $s_1^{(k+1)}$, or a fourteenth replaceable signal transition (i.e., rt14) from symbol $s_5^{(k)}$ to symbol $s_1^{(k+1)}$ may be changed to a fourteenth unused signal transition (i.e., ut14) from symbol $s_5^{(k)}$ to symbol $s_1^{(k+1)}$, while a seventeenth replaceable signal transition (i.e., rt17) from symbol $s_1^{(k+1)}$ to symbol $s_2^{(k+1)}$ may be changed to a seventeenth unused signal transition (i.e., ut17) from symbol $s_1^{(k+1)}$ to symbol $s_2^{(k+1)}$, or an eighteenth replaceable signal transition (i.e., rt18) from symbol $s_1^{(k+1)}$ to symbol $s_2^{(k+1)}$ may be changed to an eighteenth unused signal transition (i.e., ut18) from symbol $s_1^{(k+1)}$ to symbol $s_2^{(k+1)}$, thereby allowing these previously unused signal transitions to be used for other beneficial purposes in accordance with the present disclosure. This is because such use would not form any of the restricted signal transitions (i.e., rut15, rut16), nor would it violate the transition-limiting properties (e.g., elimination of full-swing transitions) of the transition-limiting code. For example, if $s_5^{(k)}$ is 01 and $s_2^{(k+1)}$ is 01, then $s_1^{(k+1)}$ may be 00 because neither the transition from $s_5^{(k)}$ to $s_1^{(k+1)}$ (i.e., ut14 from 01 to 00) nor the transition from $s_1^{(k+1)}$ to $s_2^{(k+1)}$ (i.e., ut17 from 00 to 01) is a full-swing transition when using the Gray code assignment shown in FIG. 2.

Analogously, for example, in Case IV, when the signal level of the fifth symbol in the first codeword (i.e., $s_5^{(k)}$, wherein k=1, 2, 3, . . . ) is 11 or 10, and the signal level of the second symbol in the second codeword (i.e., $s_2^{(k+1)}$, wherein k=1, 2, 3, . . . ) is 11 or 10, then the unused signal transitions associated with arriving at (i.e., ut20, ut21) and leaving (i.e., ut22, ut23) the lowermost signal level (i.e., 10) of the first symbol in the second codeword (i.e., $s_1^{(k+1)}$, wherein k=1, 2, 3, . . . ) may be used for other beneficial purposes in accordance with the present disclosure. In other words, a twentieth replaceable signal transition (i.e., rt20) from symbol $s_5^{(k)}$ to symbol $s_1^{(k+1)}$ may be changed to a twentieth unused signal transition (i.e., ut20) from symbol $s_5^{(k)}$ to symbol $s_1^{(k+1)}$, or a twenty-first replaceable signal transition (i.e., rt21) from symbol $s_5^{(k)}$ to symbol $s_1^{(k+1)}$ may be changed to a twenty-first unused signal transition (i.e., ut21) from symbol $s_5^{(k)}$ to symbol $s_1^{(k+1)}$, while a twenty-second replaceable signal transition (i.e., rt22) from symbol $s_1^{(k+1)}$ to symbol $s_2^{(k+1)}$ may be changed to a twenty-second unused signal transition (i.e., ut22) from symbol $s_1^{(k+1)}$ to symbol $s_2^{(k+1)}$, or a twenty-third replaceable signal transition (i.e., rt23) from symbol $s_1^{(k+1)}$ to symbol $s_2^{(k+1)}$ may be changed to a twenty-third unused signal transition (i.e., ut23) from symbol $s_1^{(k+1)}$ to symbol $s_2^{(k+1)}$, thereby allowing these previously unused signal transitions to be used for other beneficial purposes in accordance with the present disclosure. This is because such use would not form any of the restricted signal transitions (rut19, rut24), nor would it violate the transition-limiting properties of the transition-limiting code. For example, if $s_5^{(k)}$ is 10 and $s_2^{(k+1)}$ is 10, then $s_1^{(k+1)}$ may be 10 because neither the transition from $s_5^{(k)}$ to $s_1^{(k+1)}$ (i.e., ut21 from 10 to 10) nor the transition from $s_1^{(k+1)}$ to $s_2^{(k+1)}$ (i.e., ut22 from 10 to 10) is a full-swing transition when using the Gray code assignment shown in FIG. 2. At this point it should be noted that the signal level designations shown in FIGS. 1 and 2 are such that a two-bit binary value is assigned to each signal level (e.g., a Gray code assignment). Each sequential symbol carries this two-bit binary value in a 4-PAM signaling system. It should be noted, however, that the present disclosure is not limited to 4-PAM signaling systems or to signal level designations having Gray code assignments. For example, the present disclosure may be used in any N-PAM signaling system, wherein N is greater than or equal to 2. Also, the present disclosure may be realized such that the periodically unused and restricted signal transitions may be located elsewhere in an N-PAM signaling system. For example, periodically or non-periodically unused and restricted signal transitions may be located anywhere within or between codewords in an N-PAM signaling system.

At this point it should be noted that the binary signal level designations shown in FIGS. 1 and 2 may be associated with many different combinations of signal voltage, current, or other unit levels. For example, in a very simplified case, the 00 binary signal level designation may be associated with +0.500 volts, the 01 binary signal level designation may be associated with +0.167 volts, the 11 binary signal level designation may be associated with −0.167 volts, and the 10 binary signal level designation may be associated with −0.500 volts. Of course, the present disclosure is not limited in this regard since, as mentioned above, the binary signal level designations shown in FIGS. 1 and 2 may be associated with many different combinations of signal voltages. The present disclosure may also be used in systems in which the signal level designations are expressed in terms of current, or other unit, levels. In some instances, it is useful to express the binary signal level designations using unitless values which are representative of normalized amplitudes of voltages associated with the binary signal level designations. For example, in a 4-PAM signaling system, the binary signal level designations may be expressed as −3, −1, +1, and +3. Expressing the binary signal level designations in this manner facilitates expressing the sum of the levels and differences between levels as integer values.

It should also be noted that, with respect to Cases I–IV shown in FIG. 2, the primary transition-limiting property of the transition-limiting code was generally the elimination of full-swing transitions between symbols, and specifically the elimination of full-swing transitions to/from the first symbol of each codeword. However, the present disclosure is not limited in this regard. That is, other transition-limiting codes using different transition-limiting properties in addition to, or instead of, the elimination of full-swing transitions may be used in accordance with the present disclosure. Indeed, the present disclosure is not even limited to transition-limiting codes, but rather is applicable to all codes having a characteristic wherein at least one periodically unused or restricted signal transition is present. For example, in order to further reduce signal distortion, a transition-limiting code having transition-limiting properties of eliminating both full and second order swing transitions may be used. In such an example, again using a Gray code assignment and the symbol definition provided above, when $s_5^{(k)}$ is 00 and $s_2^{(k+1)}$ is either 00 or 01, then $s_1^{(k+1)}$ may be 00 because neither the transition from $s_5^{(k)}$ to $s_1^{(k+1)}$ (i.e., 00 to 00) nor the transitions from $s_2^{(k+1)}$ to $s_2^{(k+1)}$ (i.e., 00 to 00 or 00 to 01) are full or second order swing transitions, and the upper 4-PAM signal level, and its associated signal transitions, can still be used for other beneficial purposes. In another example, the transition-limiting properties of the transition-limiting code may include the elimination of full-swing transitions and a guaranteed clock data recovery (CDR) transition density. For example, the guaranteed CDR transition density may require that there be at least one signal transition in the 4 possible signal transitions in a 5 symbol codeword. In such an example, if $s_2^{(k+1)}$ is 00, $s_3^{(k+1)}$ is 00, $s_4^{(k+1)}$ is 00, and $s_5^{(k+1)}$ is 00, then the CDR transition density property would prohibit $s_1^{(k+1)}$ from being changed from 01 to 00. In a further example, the transition-limiting properties of the transition-limiting code may include the reduction of full-swing transitions and a guaranteed clock data recovery (CDR) transition density. For example, the guaranteed CDR transition density may require that there be at least one signal transition in the 4 possible signal transitions in a 5 symbol codeword, but not all full-swing transitions may be required to be eliminated. In a still further example, in a code having a characteristic wherein at least one periodically unused or restricted signal transition is present, the present disclosure allows the at least one periodically unused or restricted signal transition to be used for other beneficial purposes. The code may be any XSYS code, wherein X is greater than or equal to 1 and Y is greater than X. The only limitation is that the number of periodically unused or restricted signal transitions be greater than or equal to 1.

Figure 3:
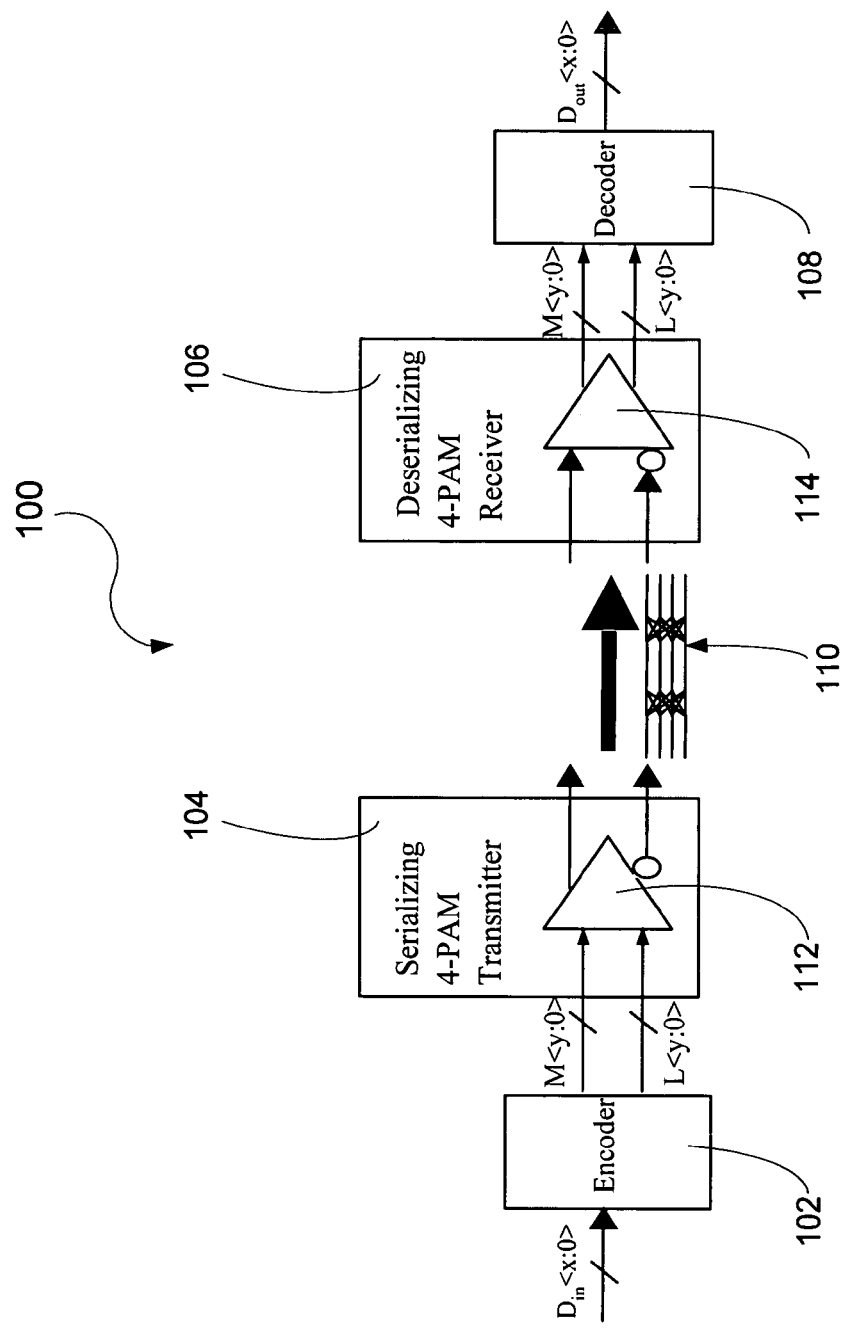
FIG. 3 shows a generic 4-PAM signaling system for supporting a technique for utilizing spare bandwidth resulting from the use of transition-limiting codes in accordance with an embodiment of the present disclosure.

Referring to FIG. 3, there is shown an exemplary embodiment of a 4-PAM signaling system 100 comprising an encoder 102, a serializing 4-PAM transmitter 104, a deserializing 4-PAM receiver 106, and a decoder 108. The serializing 4-PAM transmitter 104 and the deserializing 4-PAM receiver 106 are interconnected by a pair of signal carrying conductors 110.

In the embodiment of FIG. 3, the encoder 102 receives parallel input data $D_{in}$, and then encodes the received parallel input data $D_{in}$ so as to provide parallel codewords to the serializing 4-PAM transmitter 104 that are organized as MSB codewords (M) and LSB codewords (L). The MSB codewords (M) and the LSB codewords (L) together include multiple consecutive symbols. The parallel input data $D_{in}$ is received as a word having x+1 bits. The MSB codewords (M) and the LSB codewords (L) each have y+1 bits. The encoder 102 may be implemented, for example, with binary logic, as described in the above-referenced U.S. patent application Ser. No. 10/314,985.

The serializing 4-PAM transmitter 104 receives the MSB codewords (M) and the LSB codewords (L) in parallel form from the encoder 102. The serializing 4-PAM transmitter 104 comprises a differential transmitter 112 for differentially serially transmitting the received multiple consecutive symbols in the MSB codewords (M) and the LSB codewords (L) over the pair of signal carrying conductors 110 to the deserializing 4-PAM receiver 106.

The deserializing 4-PAM receiver 106 comprises a differential receiver 114 for differentially serially receiving the multiple consecutive symbols in the MSB codewords (M) and the LSB codewords (L) over the pair of signal carrying conductors 110 from the serializing 4-PAM transmitter 104. The differential receiver 114 then transmits the MSB codewords (M) and the LSB codewords (L) in parallel form to the decoder 108.

The decoder 108 is essentially the inverse of the encoder 102. That is, the decoder 108 receives the MSB codewords (M) and the LSB codewords (L) in parallel form from the deserializing 4-PAM receiver 106, and then decodes the received MSB codewords (M) and the received LSB codewords (L) so as to provide parallel output data $D_{out}$. The parallel output data $D_{out}$ is provided as a word having x+1 bits. The decoder 108 may be implemented, for example, with binary logic, as described in the above-referenced U.S. patent application Ser. No. 10/314,985.

At this point it should be noted that, while FIG. 3 shows the serializing 4-PAM transmitter 104 as having the differential transmitter 112 and the deserializing 4-PAM receiver 106 as having the differential receiver 114, the present disclosure is not limited in this regard. That is, the MSB codewords (M) and the LSB codewords (L) may be transmitted from the serializing 4-PAM transmitter 104 to the deserializing 4-PAM receiver 106 in a single-ended manner requiring only a single-ended transmitter and a single-ended receiver. Thus, the serializing 4-PAM transmitter 104 and the deserializing 4-PAM receiver 106 may alternatively be interconnected by a single signal carrying conductor instead of the pair of signal carrying conductors 110. Alternatively still, in an optical based system, the serializing 4-PAM transmitter 104 and the deserializing 4-PAM receiver 106 may be interconnected by an optical fiber capable carrying signals at multiple optical signal levels. Alternatively even still, in a wireless based system, the serializing 4-PALM transmitter 104 and the deserializing 4-PAM receiver 106 may not be interconnected by any fixed transmission medium, but rather the MSB codewords (M) and the LSB codewords (L) may be transmitted from the serializing 4-PAM transmitter 104 to the deserializing 4-PAM receiver 106 via a wireless protocol.

For purposes of clearly describing the present disclosure, assume that the 4-PAM signaling system 100 shown in FIG. 3 is utilizing a 4S5S transition-limiting code as described in the above-referenced U.S. patent application Ser. No. 10/314,985. Thus, in the embodiment of FIG. 3, the encoder 102 receives parallel input data $D_{in}<7:0>$, and then encodes the received parallel input data $D_{in}<7:0>$ so as to provide parallel codewords to the serializing 4-PAM transmitter 104 that are organized as MSB codewords (M<4:0>) and LSB codewords (L<4:0>). The parallel input data $D_{in}<7:0>$ is received as an 8-bit word. The MSB codewords (M<4:0>) and the LSB codewords (L<4:0>) each have 5 bits, wherein each MSB codeword (M<4:0>) has five codeword bits organized as $<C_1, C_3, C_5, C_7, C_9>$ and each LSB codeword (L<4:0>) has five codeword bits organized as $<C_2, C_4, C_6, C_8, C_{10}>$. Thus, the MSB codewords (M<4:0>) and the LSB codewords (L<4:0>) together form 10-bit codewords (i.e., $C_1, C_2, C_3, C_4, C_5, C_6, C_7, C_8, C_9, C_{10}$) that are represented by groups of consecutive 2-bit symbols (i.e., $C_1$ & $C_2$, $C_3$ & $C_4$, $C_5$ & $C_6$, $C_7$ & $C_8$, and $C_9$ & $C_{10}$).

Referring to FIG. 4, there are shown three tables. The first table (top) is a mapping table containing symbol domain and codeword bit domain transition mappings that may be used when spare bandwidth associated with periodically unused signal transitions may be used for other beneficial purposes in the above-described Case I scenario (see FIG. 2) in accordance with an embodiment of the present disclosure. The second table (middle) is a list of all the non-replaceable transitions (i.e., nrt3, nrt4), and the third table (bottom) is a list of all the restricted transitions (i.e., rut3, rut4).

Referring to FIG. 5, there are shown three tables. The first table (top) is a mapping table containing symbol domain and codeword bit domain transition mappings that may be used when spare bandwidth associated with periodically unused signal transitions may be used for other beneficial purposes in the above-described Case II scenario (see FIG. 2) in accordance with an embodiment of the present disclosure. The second table (middle) is a list of all the non-replaceable transitions (i.e., nrt7, nrt12), and the third table (bottom) is a list of all the restricted transitions (i.e., rut7, rut12).

Referring to FIG. 6, there are shown three tables. The first table (top) is a mapping table containing symbol domain and codeword bit domain transition mappings that may be used when spare bandwidth associated with periodically unused signal transitions may be used for other beneficial purposes in the above-described Case III scenario (see FIG. 2) in accordance with an embodiment of the present disclosure. The second table (middle) is a list of all the non-replaceable transitions (i.e., nrt15, nrt16), and the third table (bottom) is a list of all the restricted transitions (i.e., rut15, rut16).

Referring to FIG. 7, there are shown three tables. The first table is a mapping table containing symbol domain and codeword bit domain transition mappings that may be used when spare bandwidth associated with periodically unused signal transitions may be used for other beneficial purposes in the above-described Case IV scenario (see FIG. 2) in accordance with and embodiment of the present disclosure. The second table (middle) is a list of all the non-replaceable transitions (i.e., nrt19, nrt24), and the third table (bottom) is a list of all the restricted transitions (i.e., rut19, rut24).

Figure 8:
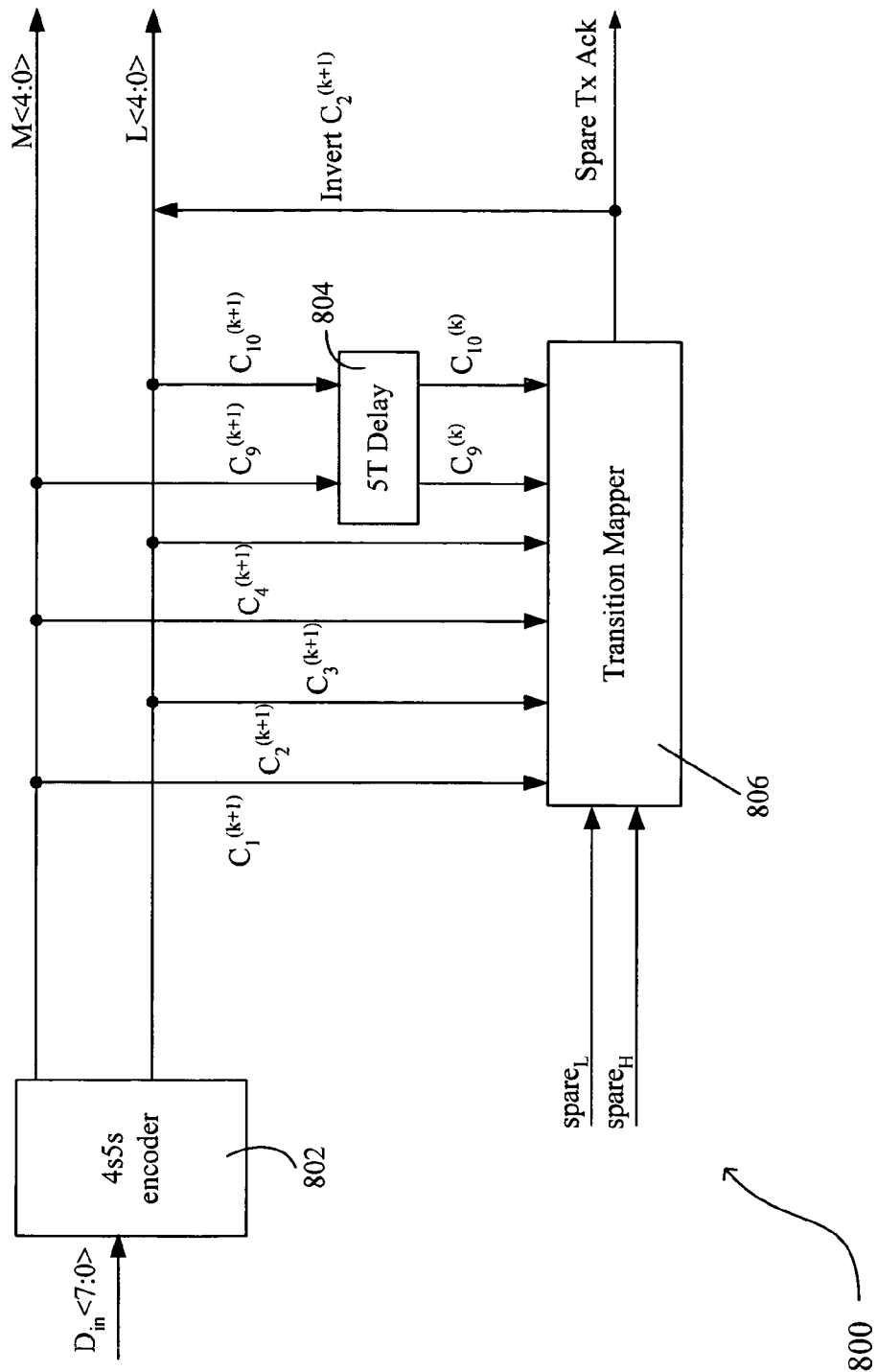
FIG. 8 shows modified 4S5S encoder circuitry for use in utilizing spare bandwidth resulting from the use of a 4S5S transition-limiting code in a 4-PAM signaling system for the Case I and II scenarios described in FIGS. 2, 4, and 5, respectively, in accordance with an embodiment of the present disclosure.

Referring to FIG. 8, there is shown modified 4S5S encoder circuitry 800 for use in utilizing spare bandwidth resulting from the use of a 4S5S transition-limiting code, such as described in the above-referenced U.S. patent application Ser. No. 10/314,985, in a 4-PAM signaling system, such as shown in FIG. 3, for the Case I and II scenarios described above in FIGS. 2, 4, and 5, respectively, in accordance with an embodiment of the present disclosure. The modified 4S5S encoder circuitry 800 comprises a 4S5S encoder 802, delay circuitry 804, and transition mapper circuitry 806.

The 4S5S encoder 802 receives parallel input data $D_{in}<7:0>$, and then encodes the received parallel input data $D_{in}<7:0>$ so as to provide parallel codewords to a serializing 4-PAM transmitter (not shown) that are organized as MSB codewords (M<4:0>) and LSB codewords (L<4:0>). As described above, the parallel input data $D_{in}<7:0>$ is received as an 8-bit word. The MSB codewords (M<4:0>) and the LSB codewords (L<4:0>) each have 5 bits, wherein each MSB codeword (M<4:0>) has five codeword bits organized as $<C_1, C_3, C_5, C_7, C_9>$ and each LSB codeword (L<4:0>) has five codeword bits organized as $<C_2, C_4, C_6, C_8, C_{10}>$. Thus, the MSB codewords (M<4:0>) and the LSB codewords (L<4:0>) together form 10-bit codewords that are represented by groups of consecutive 2-bit symbols. The 4S5S encoder 802 may be implemented, for example, with binary logic.

The delay circuitry 804 and the transition mapper circuitry 806 operate to determine whether or not the $C_2$ bit in the LSB codeword (L<4:0>) may be changed from a logic "1" state to a logic "0" state so that spare bandwidth associated with periodically unused signal transitions may be used for other beneficial purposes in accordance with the present disclosure. That is, the delay circuitry 804 provides a 5T delay for both the $C_9$ bit in the MSB codeword (M<4:0>) and the $C_{10}$ bit in the LSB codeword (L<4:0>), wherein T is the symbol period as defined above. The transition mapper circuitry 806 operates according to the symbol domain and codeword bit domain logic tables shown in FIGS. 4–7. The delay circuitry 804 and the transition mapper circuitry 806 may be implemented, for example, with binary logic.

The transition mapper circuitry 806 receives $C_1^{(k+1)}$ and $C_3^{(k+1)}$ bits from the MSB codeword (M<4:0>), $C_2^{(k+1)}$ and $C_4^{(k+1)}$ bits from the LSB codeword (L<4:0>), the delayed $C_9^{(k)}$ bit from the delay circuitry 804, the delayed $C_{10}^{(k)}$ bit from the delay circuitry 804, and spare bandwidth input signals (i.e., $spare_H$ and $spare_L$), which represent additional information to be transmitted in spare bandwidth associated with periodically unused signal transitions. Based upon these received signals, the transition mapper circuitry 806 generates an "Invert $C_2^{(k+1)}$" output signal and a "Spare TX Ack" output signal. More specifically, the $spare_H$ signal represents additional information to be transmitted in spare bandwidth associated with unused signal transitions ut1 and ut2 if rt1 and rt2 are present, respectively, while signal transition nrt4 is absent. The $spare_L$ signal represents additional information to be transmitted in spare bandwidth associated with unused signal transitions ut8 and ut9 if rt8 and rt9 are present, respectively, while signal transition nrt12 is absent. The "Invert $C_2^{(k+1)}$" signal is used to change the $C_2^{(k+1)}$ bit in the LSB codeword (L<4:0>) from a logic "1" state to a logic "0" state so that spare bandwidth associated with periodically unused signal transitions may be used for other beneficial purposes in accordance with the present disclosure. The "Spare TX Ack" signal provides a notification to circuitry that generates the $spare_H$ and $spare_L$ signals (not shown) that the additional information represented by the $spare_H$ or $spare_L$ signals has actually been transmitted.

Figure 8A:
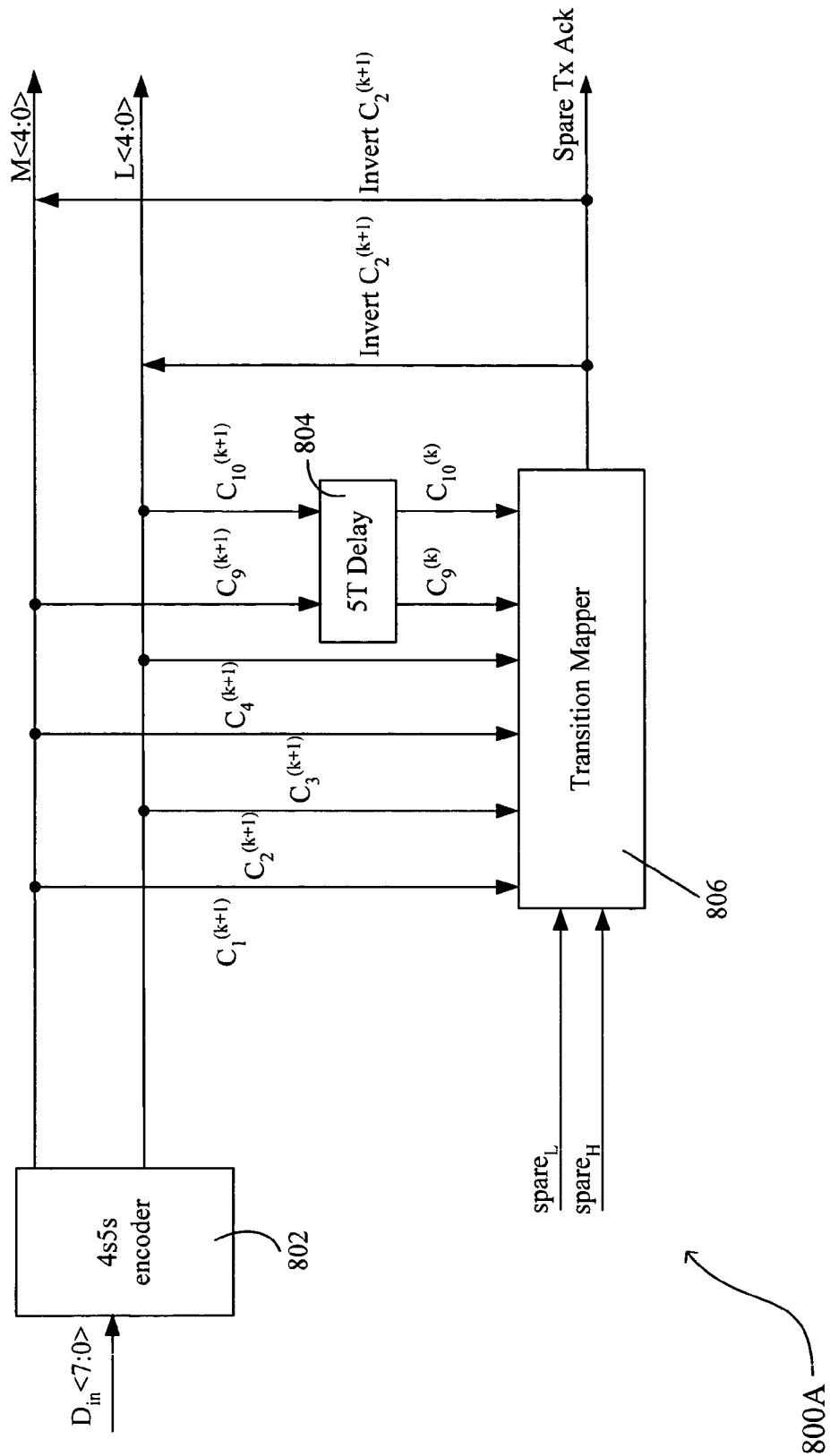
FIG. 8A shows modified 4S5S encoder circuitry for use in utilizing spare bandwidth resulting from the use of a 4S5S transition-limiting code in a 4-PAM signaling system for the Case III and IV scenarios described in FIGS. 2, 6, and 7, respectively, in accordance with an embodiment of the present disclosure.

Referring to FIG. 8A, there is shown modified 4S5S encoder circuitry 800A for use in utilizing spare bandwidth resulting from the use of a 4S5S transition-limiting code, such as described in the above-referenced U.S. patent application Ser. No. 10/314,985, in a 4-PAM signaling system, such as shown in FIG. 3, for the Case III and IV scenarios described above in FIGS. 2, 6, and 7, respectively, in accordance with an embodiment of the present disclosure. The modified 4S5S encoder circuitry 800A comprises a 4S5S encoder 802, delay circuitry 804, and transition mapper circuitry 806.

The 4S5S encoder 802 receives parallel input data $D_{in}$<7:0>, and then encodes the received parallel input data $D_{in}$<7:0> so as to provide parallel codewords to a serializing 4-PAM transmitter (not shown) that are organized as MSB codewords (M<4:0>) and LSB codewords (L<4:0>). As described above, the parallel input data $D_{in}$<7:0> is received as an 8-bit word. The MSB codewords (M<4:0>) and the LSB codewords (L<4:0>) each have 5 bits, wherein each MSB codeword (M<4:0>) has five codeword bits organized as <$C_1$, $C_3$, $C_5$, $C_7$, $C_9$> and each LSB codeword (L<4:0>) has five codeword bits organized as <$C_2$, $C_4$, $C_6$, $C_8$, $C_{10}$>. Thus, the MSB codewords (M<4:0>) and the LSB codewords (L<4:0>) together form 10-bit codewords that are represented by groups of consecutive 2-bit symbols. The 4S5S encoder 802 may be implemented, for example, with binary logic.

The delay circuitry 804 and the transition mapper circuitry 806 operate to determine whether or not the $C_2$ bit in the LSB codeword (L<4:0>) and the $C_1$ bit in the MSB codeword (M<4:0>) may be inverted so that spare bandwidth associated with periodically unused signal transitions may be used for other beneficial purposes in accordance with the present disclosure. That is, the delay circuitry 804 provides a 5T delay for both the $C_9$ bit in the MSB codeword (M<4:0>) and the $C_{10}$ bit in the LSB codeword (L<4:0>), wherein T is the symbol period as defined above. The transition mapper circuitry 806 operates according to the symbol domain and codeword bit domain logic tables shown in FIGS. 4–7. The delay circuitry 804 and the transition mapper circuitry 806 may be implemented, for example, with binary logic.

The transition mapper circuitry 806 receives $C_1^{(k+1)}$ and $C_3^{(k+1)}$ bits from the MSB codeword (M<4:0>), $C_2^{(k+1)}$ and $C_4^{(k+1)}$ bits from the LSB codeword (L<4:0>), the delayed $C_9^{(k)}$ bit from the delay circuitry 804, the delayed $C_{10}^{(k)}$ bit from the delay circuitry 804, and spare bandwidth input signals (i.e., $spare_H$ and $spare_L$), which represent additional information to be transmitted in spare bandwidth associated with periodically unused signal transitions. Based upon these received signals, the transition mapper circuitry 806 generates an "Invert $C_1^{(k+1)}$ and $C_2^{(k+1)}$" output signal and a "Spare TX Ack" output signal. More specifically, the $spare_H$ signal represents additional information to be transmitted in spare bandwidth associated with unused signal transitions ut13 and ut14 if rt13 and rt14 are present, respectively, while signal transition nrt16 is absent. The $spare_L$ signal represents additional information to be transmitted in spare bandwidth associated with unused signal transitions ut20 and ut21 if rt20 and rt21 are present, respectively, while signal transition nrt24 is absent. The "Invert $C_1^{(k+1)}$ and $C_2^{(k+1)}$" signal is used to change the $C_2^{(k+1)}$ bit in the LSB codeword (L<4:0>) from a logic "1" state to a logic "0" state and the $C_1^{(k+1)}$ bit in the MSB codeword (M<4:0>), so that spare bandwidth associated with periodically unused signal transitions may be used for other beneficial purposes in accordance with the present disclosure. The "Spare TX Ack" signal provides a notification to circuitry that generates the $spare_H$ and $spare_L$ signals (not shown) that the additional information represented by the $spare_H$ or $spare_L$ signals has actually been transmitted.

Figure 9:
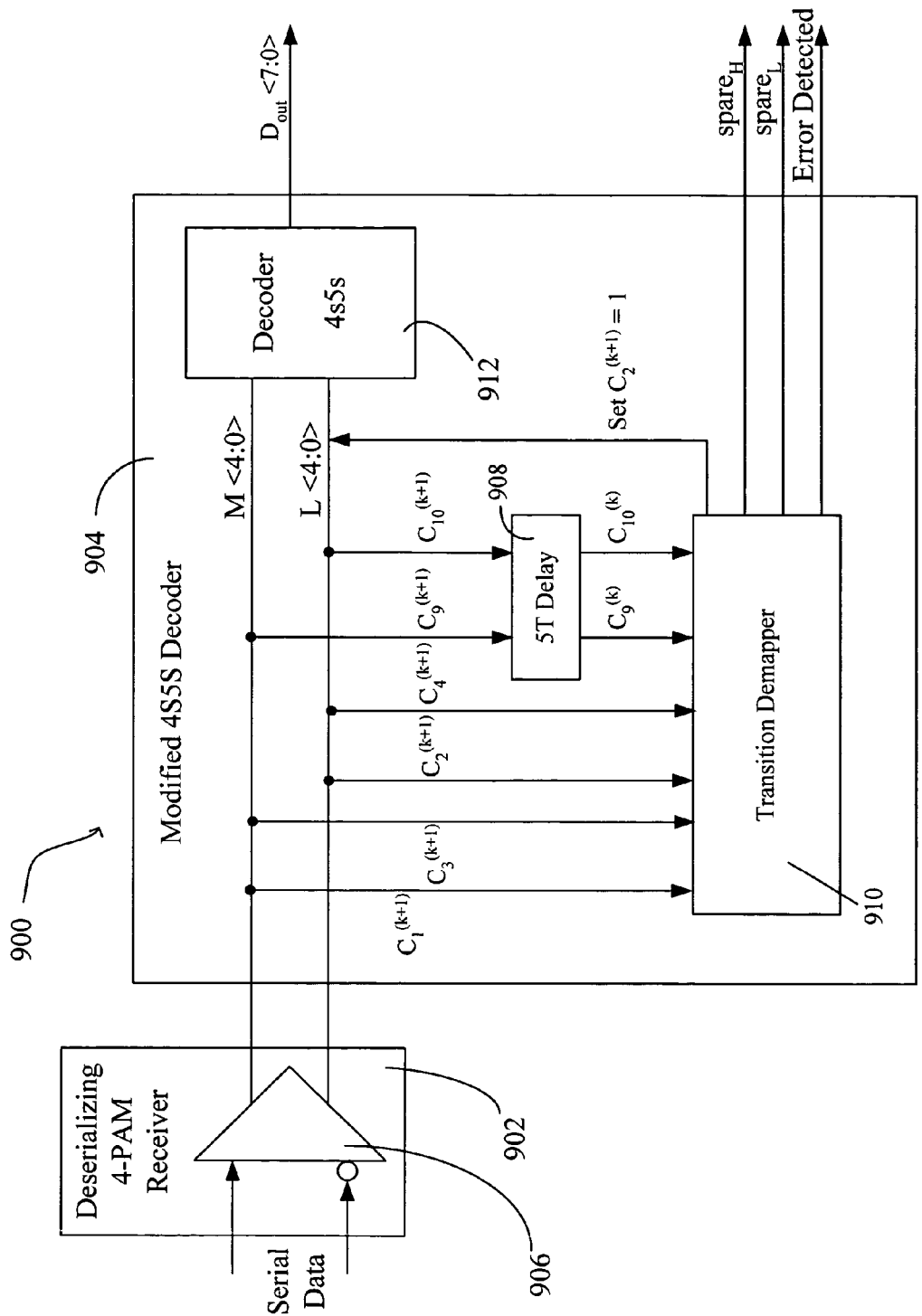
FIG. 9 shows circuitry for use in receiving and decoding codewords that have been modified to utilize spare bandwidth resulting from the use of a 4S5S transition-limiting code in a 4-PAM signaling system for the Case I and II scenarios described in FIGS. 2, 4, and 5, respectively, in accordance with an embodiment of the present disclosure.

Referring to FIG. 9, there is shown circuitry 900 for use in receiving and decoding codewords that have been modified to utilize spare bandwidth resulting from the use of a 4S5S transition-limiting code, such as described in the above-referenced U.S. patent application Ser. No. 10/314,985, in a 4-PAM signaling system, such as shown in FIG. 3, for the Case I and II scenarios described above in FIGS. 2, 4, and 5, respectively, in accordance with an embodiment of the present disclosure. The circuitry 900 comprises a deserializing 4-PAM receiver 902 and a modified 4S5S decoder 904. The deserializing 4-PAM receiver 902 comprises a differential receiver 906 for differentially serially receiving the multiple consecutive symbols in the MSB codewords (M<4:0>) and the LSB codewords (L<4:0>) from a serializing 4-PAM transmitter (not shown). The differential receiver 906 then transmits the MSB codewords (M<4:0>) and the LSB codewords (L<4:0>) in parallel form to the modified 4S5S decoder 904.

The modified 4S5S decoder 904 comprises delay circuitry 908, transition demapper circuitry 910, and a 4S5S decoder 912. The modified 4S5S decoder 904 receives the MSB codewords (M<4:0>) and the LSB codewords (L<4:0>) in parallel form from the differential receiver 906. The delay circuitry 908 and the transition demapper circuitry 910 operate to determine whether or not an unused or a restricted transition is present. Detection of an unused transition indicates that spare bandwidth associated with periodically unused signal transitions has been used for other beneficial purposes in accordance with the present disclosure. Detection of a restricted transition forms a condition for assertion of the "Error Detected" signal. That is, the delay circuitry 908 provides a 5T delay for both the $C_9$ bit in the MSB codeword (M<4:0>) and the $C_{10}$ bit in the LSB codeword (L<4:0>), wherein T is the symbol period as defined above. The transition demapper circuitry 910 operates according to the symbol domain and codeword bit domain logic tables shown in FIGS. 4–5. The delay circuitry 908 and the transition demapper circuitry 910 may be implemented, for example, with binary logic.

The transition demapper circuitry 910 receives $C_1^{(k+1)}$ and $C_3^{(k+1)}$ bits from the MSB codeword (M<4:0>), $C_2^{(k+1)}$ and $C_4^{(k+1)}$ bits from the LSB codeword (L<4:0>), the delayed $C_9^{(k)}$ bit from the delay circuitry 908, and the delayed $C_{10}^{(k)}$ bit from the delay circuitry 908. Based upon these received signals, the transition demapper circuitry 910 generates spare bandwidth output signals (i.e., $spare_H$ and $spare_L$), which represent additional information that has been transmitted in spare bandwidth associated with periodically unused or restricted signal transitions. More specifically, the $spare_H$ signal represents additional information that has been transmitted in spare bandwidth associated with unused signal transitions ut1, ut2, ut5, and ut6, and the $spare_L$ signal represents additional information that has been transmitted in spare bandwidth associated with unused signal transitions ut8, ut9, ut10, and ut11.

The transition demapper circuitry 910 also generates a "Set $C_2^{(k+1)}$=1" output signal, and an "Error Detected" output signal. The "Set $C_2^{(k+1)}$=1" signal is used to demap the detected unused transition back to its corresponding replaceable transition (i.e., from uti to rti, wherein i=1, 2, 5, 6, 8, 9, 10, 11).

The "Error Detected" signal is asserted if a restricted unused transition (e.g., rut3, rut4, rut7, rut12) is present in the multiple consecutive symbols in the MSB codewords (M<4:0>) and the LSB codewords (L<4:0>) received at the circuitry 900 from the serializing 4-PAM transmitter (not shown). In the exemplary embodiment, for Cases I and II, if rut3 or rut7 is present in consecutive symbols $S_5^{(k)}$ and $S_1^{(k+1)}$, or if rut4 or rut12 is present in consecutive symbols $S_1^{(k+1)}$ and $S_2^{(k+1)}$.

The 4S5S decoder 912 receives the MSB codewords (M<4:0>) and the updated LSB codewords (L<4:0>) in parallel form, and then decodes the received MSB codewords (M<4:0>) and the received LSB codewords (L<4:0>) so as to provide parallel output data $D_{out}$<7:0>. The parallel output data $D_{out}$<7:0> is provided as an 8-bit word. The 4S5S decoder 912 may be implemented, for example, with binary logic.

Figure 9A:
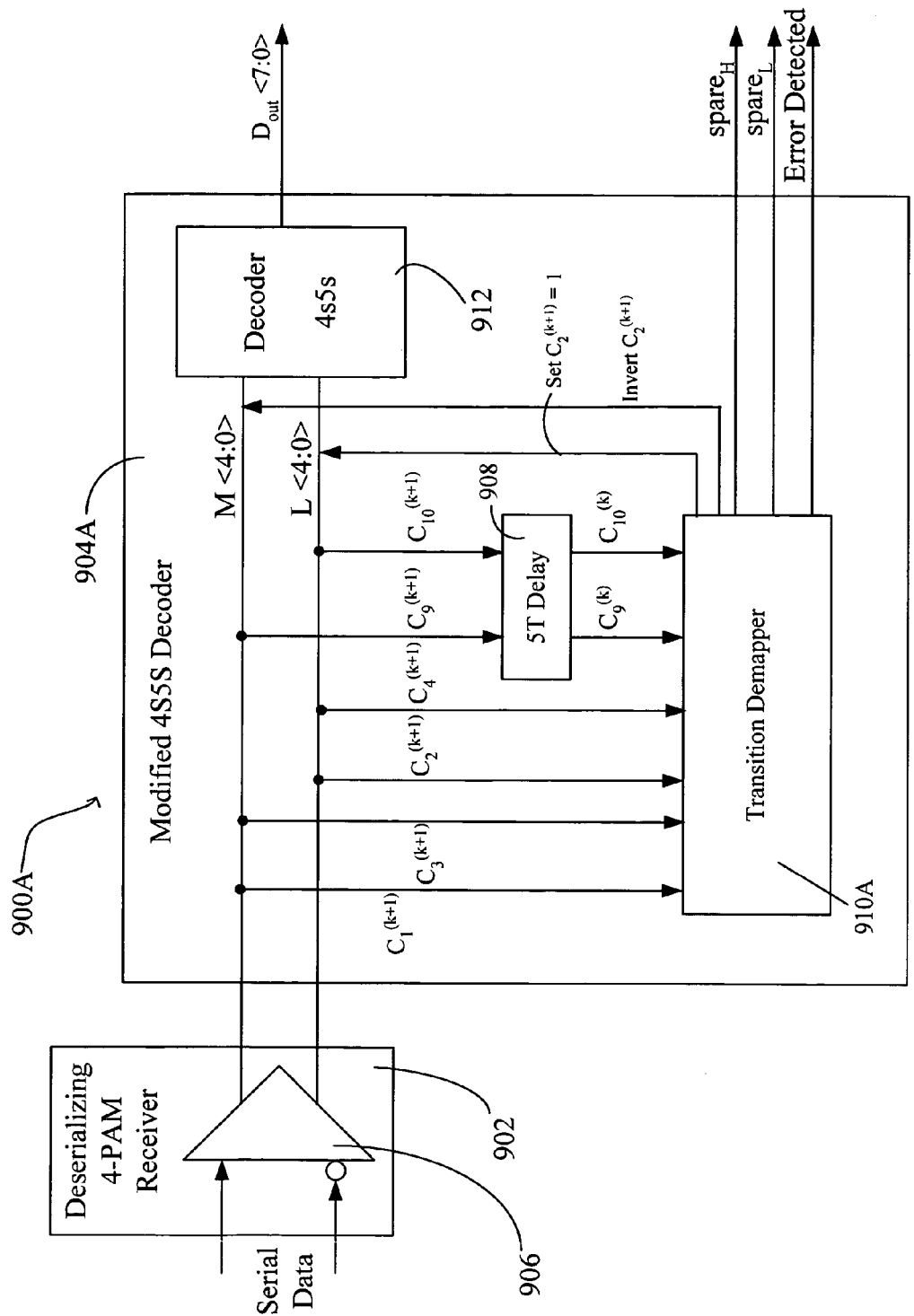
FIG. 9A shows circuitry for use in receiving and decoding codewords that have been modified to utilize spare bandwidth resulting from the use of a 4S5S transition-limiting code in a 4-PAM signaling system for the Case III and IV scenarios described in FIGS. 2, 6, and 7, respectively, in accordance with an embodiment of the present disclosure.

Referring to FIG. 9A, there is shown circuitry 900A for use in receiving and decoding codewords that have been modified to utilize spare bandwidth resulting from the use of a 4S5S transition-limiting code, such as described in the above-referenced U.S. patent application Ser. No. 10/314,985, in a 4-PAM signaling system, such as shown in FIG. 3, for the Case III and IV scenarios described above in FIGS. 2, 6, and 7, respectively, in accordance with an embodiment of the present disclosure. The circuitry 900A comprises a deserializing 4-PAM receiver 902 and a modified 4S5S decoder 904A. The deserializing 4-PAM receiver 902 comprises a differential receiver 906 for differentially serially receiving the multiple consecutive symbols in the MSB codewords (M<4:0>) and the LSB codewords (L<4:0>) from a serializing 4-PAM transmitter (not shown). The differential receiver 906 then transmits the MSB codewords (M<4:0>) and the LSB codewords (L<4:0>) in parallel form to the modified 4S5S decoder 904A.

The modified 4S5S decoder 904A comprises delay circuitry 908, transition demapper circuitry 910A, and a 4S5S decoder 912. The modified 4S5S decoder 904A receives the MSB codewords (M<4:0>) and the LSB codewords (L<4:0>) in parallel form from the differential receiver 906. The delay circuitry 908 and the transition demapper circuitry 910A operate to determine whether or not an unused or a restricted transition is present. Detection of an unused transition indicates that spare bandwidth associated with periodically unused signal transitions has been used for other beneficial purposes in accordance with the present disclosure. Detection of a restricted transition forms a condition for assertion of the "Error Detected" signal. That is, the delay circuitry 908 provides a 5T delay for both the $C_9$ bit in the MSB codeword (M<4:0>) and the $C_{10}$ bit in the LSB codeword (L<4:0>), wherein T is the symbol period as defined above. The transition demapper circuitry 910A operates according to the symbol domain and codeword bit domain logic tables shown in FIGS. 6–7. The delay circuitry 908 and the transition demapper circuitry 910A may be implemented, for example, with binary logic.

The transition demapper circuitry 910A receives $C_1^{(k+1)}$ and $C_3^{(k+1)}$ bits from the MSB codeword (M<4:0>), $C_2^{(k+1)}$ and $C_4^{(k+1)}$ bits from the LSB codeword (L<4:0>), the delayed $C_9^{(k)}$ bit from the delay circuitry 908, and the delayed $C_{10}^{(k)}$ bit from the delay circuitry 908. Based upon these received signals, the transition demapper circuitry 910A generates spare bandwidth output signals (i.e., $spare_H$ and $spare_L$), which represent additional information that has been transmitted in spare bandwidth associated with periodically unused signal transitions. More specifically, the $spare_H$ signal represents additional information that has been transmitted in spare bandwidth associated with unused signal transitions ut13, ut14, ut17, or ut18, and the $spare_L$ signal represents additional information that has been transmitted in spare bandwidth associated with unused signal transitions ut20, ut21, ut22, or ut23.

The transition demapper circuitry 910A also generates a "Set $C_2^{(k+1)}$=1" output signal, an "Invert $C_1^{(k+1)}$=1" output signal, and an "Error Detected" output signal. The "Set $C_2^{(k+1)}$=1" and "Invert $C_1^{(k+1)}$=1" signals are used to demap the detected unused transition back to its corresponding replaceable transition (i.e., from uti to rti, wherein i=13, 14, 17, 18, 20, 21, 22, 23).

The "Error Detected" signal is asserted if a restricted unused transition (e.g., rut15, rut16, rut19, rut24) is present in the multiple consecutive symbols in the MSB codewords (M<4:0>) and the LSB codewords (L<4:0>) received at the circuitry 900A from the serializing 4-PAM transmitter (not shown). In the exemplary embodiment, for Cases III and IV, if rut15 or rut19 is present in consecutive symbols $S_5^{(k)}$ and $S_1^{(k+1)}$, or if rut16 or rut24 is present in consecutive symbols $S_1^{(k+1)}$ and $S_2^{(k+1)}$.

The 4S5S decoder 912 receives the MSB codewords (M<4:0>) and the updated LSB codewords (L<4:0>) in parallel form, and then decodes the received MSB codewords (M<4:0>) and the received LSB codewords (L<4:0>) so as to provide parallel output data $D_{out}$<7:0>. The parallel output data $D_{out}$<7:0> is provided as an 8-bit word. The 4S5S decoder 912 may be implemented, for example, with binary logic.

Figure 10:
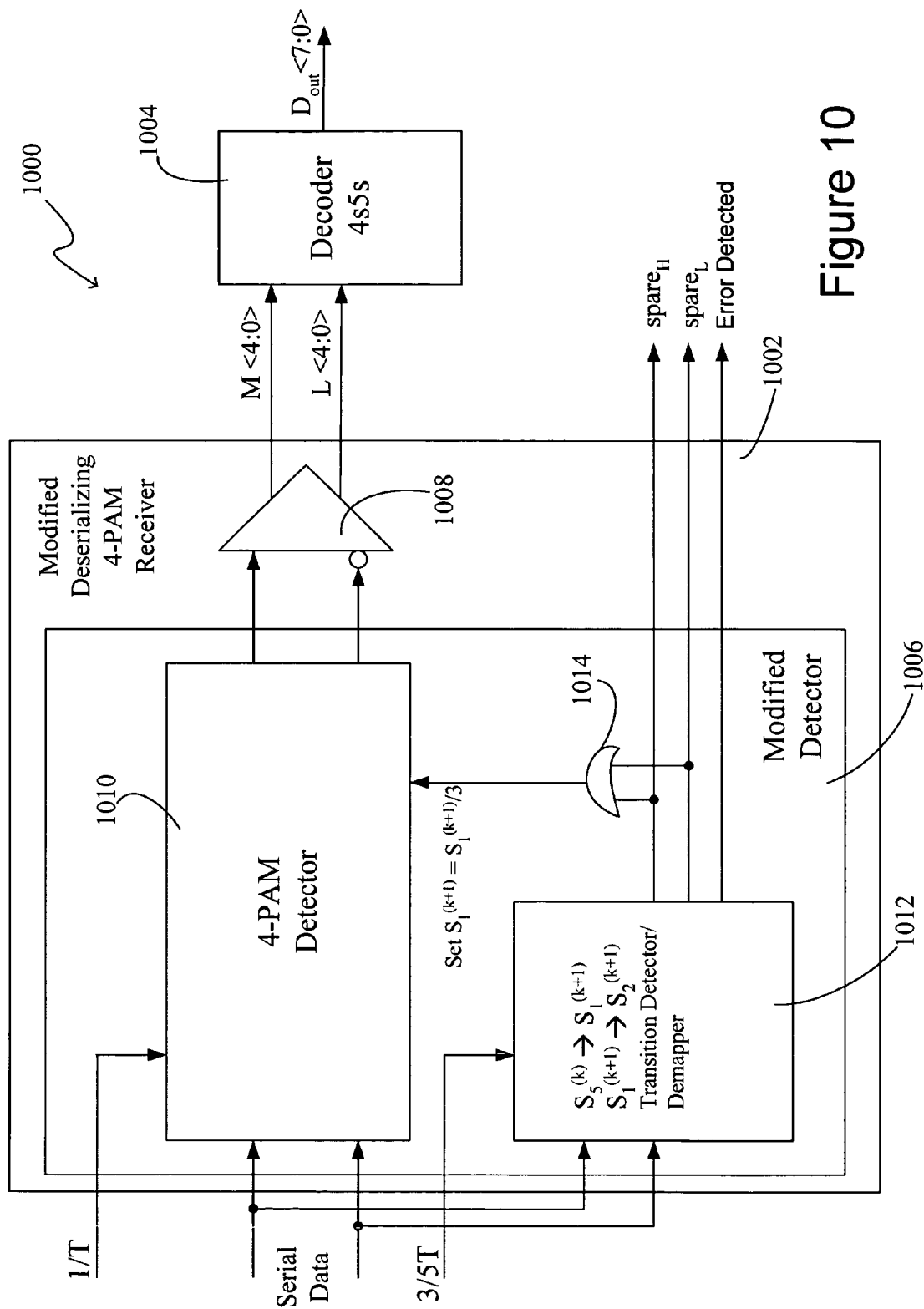
FIG. 10 shows alternative circuitry for use in receiving and decoding codewords that have been modified to utilize spare bandwidth resulting from the use of a 4S5S transition-limiting code in a 4-PAM signaling system for the Case I and II scenarios described in FIGS. 2, 4, and 5, respectively, in accordance with an embodiment of the present disclosure.

Referring to FIG. 10, there is shown an alternative embodiment to the circuitry 900 of FIG. 9. That is, FIG. 10 also shows circuitry 1000 for use in receiving and decoding codewords that have been modified to utilize spare bandwidth resulting from the use of a 4S5S transition-limiting code, such as described in the above-referenced U.S. patent application Ser. No. 10/314,985, in a 4-PAM signaling system, such as shown in FIG. 3, for the Case I and II scenarios described above in FIGS. 2, 4, and 5, respectively, in accordance with an embodiment of the present disclosure. The circuitry 1000 comprises a modified deserializing 4-PAM receiver 1002 and a 4S5S decoder 1004. The modified deserializing 4-PAM receiver 1002 comprises a modified detector 1006 and a differential receiver 1008. The modified detector 1006 comprises a 4-PAM detector 1010 and an $S_5^{(k)}S_1^{(k+1)}S_2^{(k+1)}$ transition detector/demapper 1012. The 4-PAM detector 1010 detects a multilevel signal in multiple consecutive symbols in differentially serially transmitted MSB codewords (M<4:0>) and LSB codewords (L<4:0>) received from a serializing 4-PAM transmitter (not shown). The $S_5^{(k)}S_1^{(k+1)}S_2^{(k+1)}$ transition detector/demapper 1012 detects signal transitions and specifically determines if an unused transition (e.g., ut1, ut2, ut5, ut6, ut8, ut9, ut10, ut11) is present in every received codeword. If the $S_5^{(k)}S_1^{(k+1)}S_2^{(k+1)}$ transition detector/demapper 1012 determines that an unused transition (e.g., ut1, ut2, ut5, ut6, ut8, ut9, ut10, ut11) is present in a received codeword, then the $S_5^{(k)}S_1^{(k+1)}S_2^{(k+1)}$ transition detector/demapper 1012 generates an output signal (i.e., $spare_H$ if ut1, ut2, ut5, or ut6 is present; or $spare_L$ if ut8, ut9, ut10, or ut11 is present) indicating that the received codeword contains additional information in the spare bandwidth associated with periodically unused signal transitions, in accordance with an embodiment of the present disclosure.

More specifically, if the $S_5^{(k)}S_1^{(k+1)}S_2^{(k+1)}$ transition detector/demapper 1012 determines that an unused transition (e.g., ut1, ut2, ut5, ut6, ut8, ut9, ut10, ut11) is present in a received codeword, then the $S_5^{(k)}S_1^{(k+1)}S_2^{(k+1)}$ transition detector/demapper 1012, in conjunction with a logic "OR" function 1014, also provides a control signal (i.e., a Set $S_1^{(k+1)}=-S_1^{(k+1)}/3$ signal) back to the 4-PAM detector 1010. In the embodiment of FIG. 10, the control signal (i.e., the Set $S_1^{(k+1)}=-S_1^{(k+1)}/3$ signal) is used to demap the detected unused transition uti back to its corresponding replaceable transition rt1, for i=1, 2, 5, 6, 8, 9, 10, 11. In the exemplary embodiment, for Cases I and II, if the $S_5^{(k)}S_1^{(k+1)}S_2^{(k+1)}$ transition detector/demapper 1012 determines that a restricted unused transition (e.g., rut3, rut7) is present in the consecutive symbols $S_5^{(k)}$ and $S_1^{(k+1)}$ received at the circuitry 1000 from the serializing 4-PAM transmitter (not shown), then the "Error Detected" signal is asserted. In addition, if the $S_5^{(k)}S_1^{(k+1)}S_2^{(k+1)}$ transition detector/demapper 1012 determines that a restricted unused transition (e.g., rut4, rut12) is present in the consecutive symbols $S_1^{(k+1)}$ and $S_2^{(k+1)}$ received at the circuitry 1000 from the serializing 4-PAM transmitter (not shown), then the "Error Detected" signal is asserted.

Figure 10A:
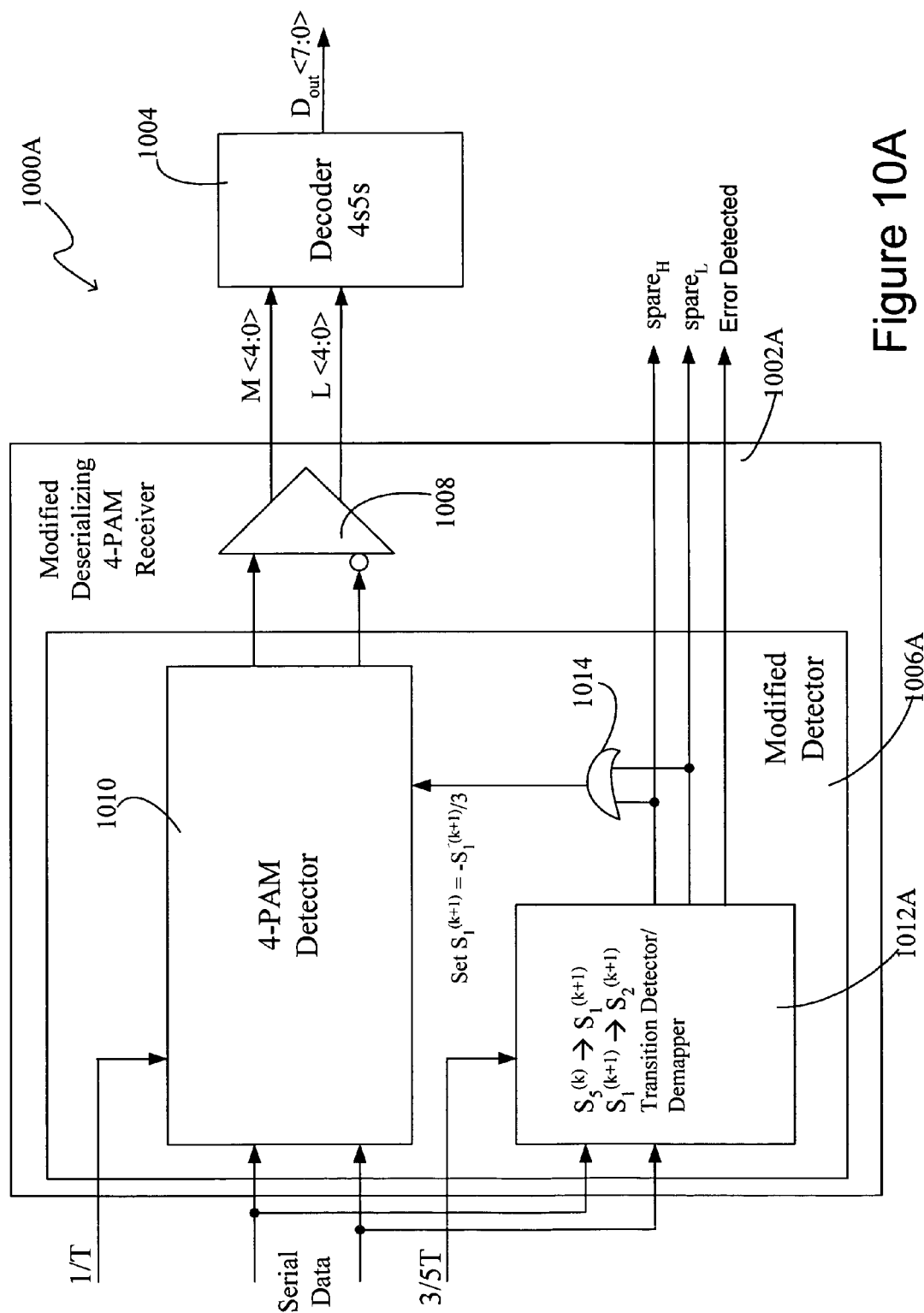
FIG. 10A shows alternative circuitry for use in receiving and decoding codewords that have been modified to utilize spare bandwidth resulting from the use of a 4S5S transition-limiting code in a 4-PAM signaling system for the Case III and IV scenarios described in FIGS. 2, 6, and 7, respectively, in accordance with an embodiment of the present disclosure.

Referring to FIG. 10A, there is shown an alternative embodiment to the circuitry 900A of FIG. 9A. That is, FIG. 10A also shows circuitry 1000A for use in receiving and decoding codewords that have been modified to utilize spare bandwidth resulting from the use of a 4S5S transition-limiting code, such as described in the above-referenced U.S. patent application Ser. No. 10/314,985, in a 4-PAM signaling system, such as shown in FIG. 3, for the Case III and IV scenarios described above in FIGS. 2, 6, and 7, respectively, in accordance with an embodiment of the present disclosure. The circuitry 1000A comprises a modified deserializing 4-PAM receiver 1002A and a 4S5S decoder 1004. The modified deserializing 4-PAM receiver 1002A comprises a modified detector 1006A and a differential receiver 1008. The modified detector 1006A comprises a 4-PAM detector 1010 and an $S_5^{(k)}S_1^{(k+1)}S_2^{(k+1)}$ transition detector/demapper 1012A. The 4-PAM detector 1010 detects a multilevel signal in multiple consecutive symbols in differentially serially transmitted MSB codewords (M<4:0>) and LSB codewords (L<4:0>) received from a serializing 4-PAM transmitter (not shown). The $S_5^{(k)}S_1^{(k+1)}S_2^{(k+1)}$ transition detector/demapper 1012A detects signal transitions, and specifically determines if an unused transition (e.g., ut13, ut14, ut17, ut18, ut20, ut21, ut22, ut23) is present in every received codeword. If the $S_5^{(k)}S_1^{(k+1)}S_2^{(k+1)}$ transition detector/demapper 1012A determines that an unused transition (e.g., ut13, ut14, ut17, ut18, ut20, ut21, ut22, ut23) is present in a received codeword, then the $S_5^{(k)}S_1^{(k+1)}S_2^{(k+1)}$ transition detector/demapper 1012A generates an output signal (i.e., spare$_H$ if ut13, ut14, ut17, or ut18 is present; or spare$_L$ if ut20, ut21, ut22, or ut23 is present) indicating that the received codeword contains additional information in the spare bandwidth associated with periodically unused signal transitions, in accordance with an embodiment of the present disclosure.

More specifically, if the $S_5^{(k)}S_1^{(k+1)}S_2^{(k+1)}$ transition detector/demapper 1012A determines that an unused transition (e.g., ut13, ut14, ut17, ut18, ut20, ut21, ut22, ut23) is present in a received codeword, then the $S_5^{(k)}S_1^{(k+1)}S_2^{(k+1)}$ detector transition detector/demapper 1012A, in conjunction with a logic "OR" function 1014, also provides a control signal (i.e., a Set $S_1^{(k+1)}=-S_1^{(k+1)}/3$ signal) back to the 4-PAM detector 1010. In the embodiment of FIG. 10A, the control signal (i.e., the Set $S_1^{(k+1)}=-S_1^{(k+1)}/3$ signal) is used to demap the detected unused transition uti back to its corresponding replaceable transition rti, for i=13, 14, 17, 18, 20, 21, 22, 23. In the exemplary embodiment, for Cases III and IV, if the $S_5^{(k)}S_1^{(k+1)}S_2^{(k+1)}$ transition detector/demapper 1012A determines that a restricted unused transition (e.g., rut15, rut19) is present in the consecutive symbols $S_5^{(k)}$ and $S_1^{(k+1)}$ received at the circuitry 1001A from the serializing 4-PAM transmitter (not shown) then the "Error Detected" signal is asserted. In addition if the $S_5^{(k)}S_1^{(k+1)}S_2^{(k+1)}$ transition detector/demapper 1012A determines that a restricted unused transition (e.g., rut16, rut24) is present in the consecutive symbols $S_1^{(k+1)}$ and $S_2^{(k+1)}$ received at the circuitry 1000A from the serializing 4-PAM transmitter (not shown) then the "Error Detected" signal is asserted.

Any encoded signals (i.e., signal transition changes rt to ut and restricted unused transitions rut described in FIGS. 4–10, 8A, 9A, 10A) could be used for communicating the following types of information or they may represent any number of types of additional information, such as, for example, control information, data information, error information, DC balancing information (e.g., information used to provide a DC voltage balancing property to the code being utilized in the system), equalization information (e.g., information used to adjust transmitter equalizer coefficients in the system), framing information, synchronization information, etc.

At this point it should be noted that utilizing spare bandwidth resulting from the use of codes in multi-PAM signaling systems in accordance with the present disclosure as described above may involve the processing of input data and the generation of output data to some extent. This input data processing and output data generation may be implemented in hardware or software. For example, as described above, specific electronic components may be employed in an encoder, decoder, or other similar or related circuitry for implementing the functions associated with utilizing spare bandwidth resulting from the use of codes in multi-PAM signaling systems in accordance with the present disclosure as described above. Alternatively, one or more processors operating in accordance with stored instructions may implement the functions associated with utilizing spare bandwidth resulting from the use of codes in multi-PAM signaling systems in accordance with the present disclosure as described above. If such is the case, it is within the scope of the present disclosure that such instructions may be stored on one or more processor readable carriers (e.g., a magnetic disk), or transmitted to one or more processors via one or more signals.

The present disclosure is not to be limited in scope by the specific embodiments described herein. Indeed, other various modifications of and modifications to the present disclosure, in addition to those described herein, will be apparent to those of ordinary skill in the art from the foregoing description and accompanying drawings. Thus, such other embodiments and modifications are intended to fall within the scope of the following appended claims. Further, although the present disclosure has been described herein in the context of a particular implementation in a particular environment for a particular purpose, those of ordinary skill in the art will recognize that its usefulness is not limited thereto and that the present disclosure can be beneficially implemented in any number of environments for any number of purposes. Accordingly, the claims set forth below should be construed in view of the full breath and spirit of the present disclosure as described herein.

The invention claimed is:

1. A method for utilizing spare bandwidth resulting from the use of a code in a multi-level signaling system, the code having a characteristic wherein a signal transition is periodically unused, the method comprising the step of:
modifying the code such that the periodically unused signal transition is used to represent additional information.

2. The method of claim 1, wherein the code is formed by encoding digital values represented by sets of N bits to provide corresponding sets of P symbols, wherein N is greater than P.

3. The method of claim 2, wherein each set of P symbols is formed with Q bits, wherein Q is greater than N.

4. The method of claim 3, wherein N=8 and Q=10.

5. The method of claim 4, wherein each symbol represents two bits.

6. The method of claim 1, wherein the step of modifying comprises:
changing the logic state of at least one codeword bit in the code.

7. The method of claim 1, wherein the additional information comprises one or more of control information, data information, error information, framing information, synchronization information, DC balancing information, and equalization information.

8. The method of claim 1, further comprising the step of:
transmitting the modified code.

9. The method of claim 8, wherein the modified code is transmitted at four signal levels on a single transmission medium.

10. The method of claim 9, wherein the single transmission medium comprises a single electrical conductor.

11. The method of claim 9, wherein the single transmission medium comprises a differential pair of electrical conductors.

12. The method of claim 9, wherein the single transmission medium comprises an optical fiber.

13. The method of claim 8, further comprising the steps of:
receiving the transmitted modified code; and
detecting the additional information in the received modified code.

14. The method of claim 13, further comprising the step of:
removing the additional information from the received modified code so as to return the modified code to an original unmodified state.

15. The method of claim 14, further comprising the step of:
decoding the original code after the additional information is removed.

16. The method of claim 8, wherein the code has a further characteristic wherein a plurality of signal transitions are periodically unused, wherein one or more of the plurality of periodically unused signal transitions is restricted from being used to represent additional information at least at certain times, further comprising the steps of:
receiving the transmitted modified code; and
detecting the use of a signal transition that has been restricted.

17. The method of claim 16, further comprising the step of:
generating an error signal based at least in part upon the detected restricted signal transition use.

18. The method of claim 1, wherein the code is a transition-limiting code.

19. The method of claim 18, wherein the transition-limiting code operates to eliminate full-swing transitions between at least two symbols of a codeword.

20. The method of claim 18, wherein the transition-limiting code operates to reduce full-swing transitions between at least two symbols of a codeword.

21. An apparatus for utilizing spare bandwidth resulting from the use of a code in a multi-level signaling system, the code having a characteristic wherein a signal transition is periodically unused, the apparatus comprising:
a modifier for modifying the code such that the periodically unused signal transition is used to represent additional information.

22. The apparatus of claim 21, wherein the code is formed by encoding digital values represented by sets of N bits to provide corresponding sets of P symbols, wherein N is greater than P.

23. The apparatus of claim 22, wherein each set of P symbols is formed with Q bits, wherein Q is greater than N.

24. The apparatus of claim 23, wherein N=8 and Q=10.

25. The apparatus of claim 24, wherein each symbol represents two bits.

26. The apparatus of claim 21, wherein the modifier modifies the code by changing the logic state of at least one codeword bit in the code.

27. The apparatus of claim 21, wherein the additional information comprises one or more of control information, data information, error information, framing information, and synchronization information, DC balancing information, and equalization information.

28. The apparatus of claim 21, further comprising:
a transmitter for transmitting the modified code.

29. The apparatus of claim 28, wherein the modified code is transmitted at four signal levels on a single transmission medium.

30. The apparatus of claim 29, wherein the single transmission medium comprises a single electrical conductor.

31. The apparatus of claim 29, wherein the single transmission medium comprises a differential pair of electrical conductors.

32. The apparatus of claim 29, wherein the single transmission medium comprises an optical fiber.

33. The apparatus of claim 28, further comprising:
a receiver for receiving the transmitted modified code; and
a detector for detecting the additional information in the received modified code.

34. The apparatus of claim 33, wherein the detector also removes the additional information from the received modified code so as to return the modified code to an original unmodified state.

35. The apparatus of claim 34, further comprising:
a decoder for decoding the original code after the additional information is removed.

36. The apparatus of claim 28, wherein the code has a further characteristic wherein a plurality of signal transitions are periodically unused, wherein one or more of the plurality of periodically unused signal transitions is restricted from being used to represent additional information at least at certain times, further comprising:
a receiver for receiving the transmitted modified code; and
a detector for detecting the use of a signal transition that has been restricted.

37. The apparatus of claim 36, wherein the detector also generates an error signal based at least in part upon the detected restricted signal transition use.

38. The apparatus of claim 21, wherein the code is a transition-limiting code.

39. The apparatus of claim 38, wherein the transition-limiting code operates to eliminate full-swing transitions between at least two symbols of a codeword.

40. The apparatus of claim 38, wherein the transition-limiting code operates to reduce full-swing transitions between at least two symbols of a codeword.

41. A method for utilizing spare bandwidth resulting from the use of a code in a multi-level signaling system, the method comprising the steps of:
encoding digital values using a code, the code having a characteristic wherein a signal transition is periodically unused; and
modifying the code such that the periodically unused signal transition is used to represent additional information.

42. The method of claim 41, further comprising the step of:
transmitting the modified code.

43. The method of claim 42, further comprising the steps of:
receiving the transmitted modified code; and
detecting the additional information in the received modified code.

44. The method of claim 43, further comprising the step of:
removing the additional information from the received modified code so as to return the modified code to an original unmodified state.

45. The method of claim 44, further comprising the step of:
decoding the original code after the additional information is removed.

46. The method of claim 42, wherein the code has a further characteristic wherein a plurality of signal transitions are periodically unused, wherein one or more of the plurality of periodically unused signal transitions is restricted from being used to represent additional information at least at certain times, further comprising the steps of:
receiving the transmitted modified code; and
detecting the use of a signal transition that has been restricted.

47. The method of claim 46, further comprising the step of:
generating an error signal based at least in part upon the detected restricted signal transition use.

48. The method of claim 41, wherein the code is a transition-limiting code.

49. The method of claim 48, wherein the transition-limiting code operates to eliminate full-swing transitions between at least two symbols of a codeword.

50. The method of claim 48, wherein the transition-limiting code operates to reduce full-swing transitions between at least two symbols of a codeword.

51. An apparatus for utilizing spare bandwidth resulting from the use of a code in a multi-level signaling system, the apparatus comprising:
an encoder for encoding digital values using a code, the code having a characteristic wherein a signal transition is periodically unused; and
a modifier for modifying the code such that the periodically unused signal transition is used to represent additional information.

52. The apparatus of claim 51, further comprising:
a transmitter for transmitting the modified code.

53. The apparatus of claim 52, further comprising:
a receiver for receiving the transmitted modified code; and
a detector for detecting the additional information in the received modified code.

54. The apparatus of claim 53, wherein the detector also removes the additional information from the received modified code so as to return the modified code to an original unmodified state.

55. The apparatus of claim 54, further comprising:
a decoder for decoding the original code after the additional information is removed.

56. The apparatus of claim 52, wherein the code has a further characteristic wherein a plurality of signal transitions are periodically unused, wherein one or more of the plurality of periodically unused signal transitions is restricted from being used to represent additional information at least at certain times, further comprising:
a receiver for receiving the transmitted modified code; and
a detector for detecting the use of a signal transition that has been restricted.

57. The apparatus of claim 56, wherein the detector also generates an error signal based at least in part upon the detected restricted signal transition use.

58. The apparatus of claim 51, wherein the code is a transition-limiting code.

59. The apparatus of claim 58, wherein the transition-limiting code operates to eliminate full-swing transitions between at least two symbols of a codeword.

60. The apparatus of claim 58, wherein the transition-limiting code operates to reduce full-swing transitions between at least two symbols of a codeword.

61. An apparatus for utilizing spare bandwidth resulting from the use of a code in a multi-level signaling system, the code having a characteristic wherein a signal transition is periodically unused, the apparatus comprising:
means for modifying the code such that the periodically unused signal transition is used to represent additional information; and
means for detecting the additional information in the modified code.

* * * * *